(12) United States Patent
Tomonaga et al.

(10) Patent No.: US 11,305,309 B2
(45) Date of Patent: Apr. 19, 2022

(54) METHOD AND DEVICE FOR REMOVING COATING ON COATED PLASTIC ARTICLE

(71) Applicants: Yamaguchi Prefectural Industrial Technology Institute, Yamaguchi (JP); ODA SANGYOU Co., Ltd., Yamaguchi (JP)

(72) Inventors: Fumiaki Tomonaga, Yamaguchi (JP); Syougo Miyazaki, Yamaguchi (JP); Shigemasa Oda, Yamaguchi (JP)

(73) Assignees: Yamaguchi Prefectural Industrial Technology Institute, Yamaguchi (JP); ODA SANGYOU Co., Ltd., Yamaguchi (JP)

( * ) Notice: Subject to any disclaimer, the term of this patent is extended or adjusted under 35 U.S.C. 154(b) by 71 days.

(21) Appl. No.: 16/849,522

(22) Filed: Apr. 15, 2020

(65) Prior Publication Data
US 2020/0238327 A1    Jul. 30, 2020

Related U.S. Application Data

(63) Continuation of application No. PCT/JP2018/038731, filed on Oct. 17, 2018.

(30) Foreign Application Priority Data

Oct. 20, 2017 (JP) .............................. JP2017-203991

(51) Int. Cl.
| | | |
|---|---|---|
| *B29B 17/00* | (2006.01) | |
| *B05C 3/04* | (2006.01) | |
| *B05D 3/10* | (2006.01) | |

(52) U.S. Cl.
CPC .................. *B05C 3/04* (2013.01); *B05D 3/10* (2013.01); *B29B 2017/001* (2013.01); *B29B 2017/0015* (2013.01)

(58) Field of Classification Search
CPC ...... B29B 17/00; B29B 17/001; B29B 17/015
See application file for complete search history.

(56) References Cited

U.S. PATENT DOCUMENTS

| | | | |
|---|---|---|---|
| 5,256,210 A | | 10/1993 | Asakawa et al. |
| 6,083,283 A | * | 7/2000 | Berkstresser, IV ...... C08J 11/08 8/102 |

(Continued)

FOREIGN PATENT DOCUMENTS

| | | |
|---|---|---|
| JP | H5-9420 A | 1/1993 |
| JP | H5-96231 A | 4/1993 |

(Continued)

OTHER PUBLICATIONS

International Preliminary Examination Report issued in PCT/JP2018/038731 dated Jun. 14, 2019, with English Translation (7 pages).

(Continued)

*Primary Examiner* — Cachet I Proctor
(74) *Attorney, Agent, or Firm* — Nakanishi IP Associates, LLC

(57) ABSTRACT

A method and a device for removing a coating on a coated plastic article allow highly efficient removal of a coating from a coated plastic article and recovery of a base after coating removal and a remover. A method for removing a coating on a coated plastic article with a remover includes shredding the article into pieces, immersing the pieces in the remover heated to a second temperature, heating the remover to a first temperature, and stirring the pieces with the heated remover. The remover includes at least one monohydric lower alcohol selected from methanol, ethanol, propanol, and 1-butanol, and swells the base, the coating, or both. The first temperature is not lower than 25° C. and not higher than a temperature 10° C. lower than a boiling point (Continued)

of the remover. The second temperature is not higher than an upper limit of the first temperature.

6 Claims, 21 Drawing Sheets

(56) References Cited

U.S. PATENT DOCUMENTS

| | | | |
|---|---|---|---|
| 6,689,821 | B2 | 2/2004 | Na et al. |
| 2002/0103266 | A1* | 8/2002 | Na .................. B29B 17/02 521/40 |
| 2004/0186033 | A1* | 9/2004 | Waldrop ............ C09D 9/00 510/201 |
| 2005/0154070 | A1* | 7/2005 | Suzuki ............... B29B 17/04 521/40.5 |
| 2005/0268946 | A1* | 12/2005 | Miles ................. B08B 3/08 134/38 |

FOREIGN PATENT DOCUMENTS

| | | | |
|---|---|---|---|
| JP | 05228432 | A * | 9/1993 |
| JP | H5-237443 | A | 9/1993 |
| JP | H6-25570 | A | 2/1994 |
| JP | H7-331138 | A | 12/1995 |
| JP | H8-257488 | A | 10/1996 |
| JP | H11-80626 | A | 3/1999 |
| JP | 2002-102784 | A | 4/2002 |
| JP | 2002-102787 | A | 4/2002 |
| JP | 2002-179955 | A | 6/2002 |
| JP | 2005-46770 | A | 2/2005 |
| JP | 2012-30467 | A | 2/2012 |
| JP | 2013-40265 | A | 2/2013 |
| JP | 2013-40266 | A | 2/2013 |
| JP | 6188068 | B2 | 8/2017 |
| KR | 20140008774 | A * | 1/2014 |

OTHER PUBLICATIONS

International Search Report issued in PCT/JP2018/038731 dated Nov. 20, 2018 with English Translation (5 pages).
Written Opinion of International Searching Authority issued in PCT/JP2018/038731 dated Nov. 20, 2018 (3 pages).
International Preliminary Examination Report issued in PCT/JP2018/038731 dated Jun. 14, 2019 (3 pages).

* cited by examiner

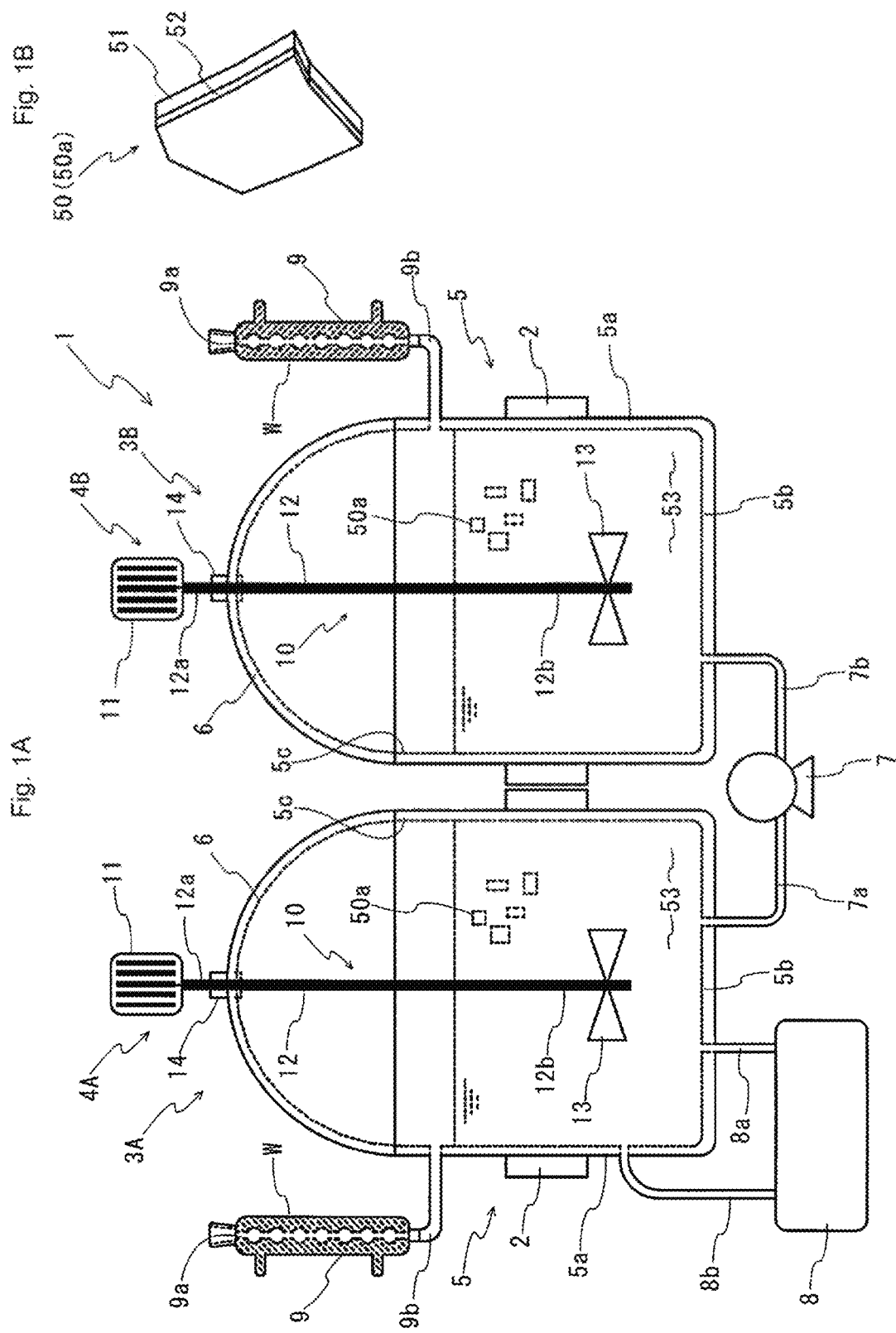

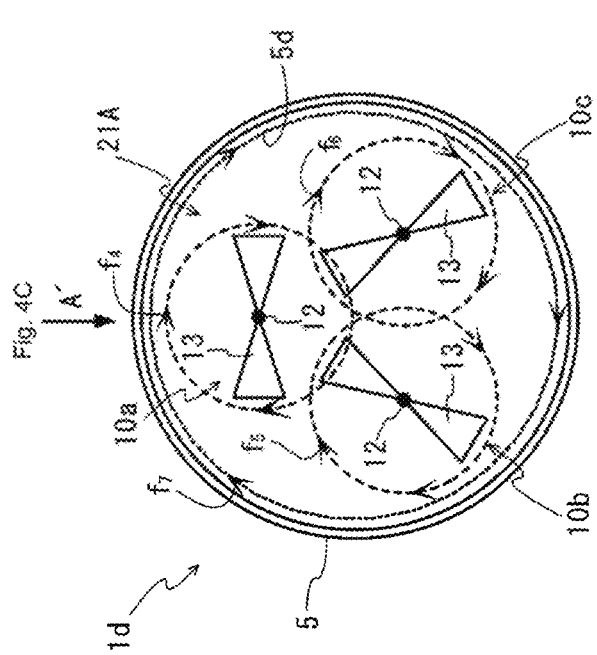
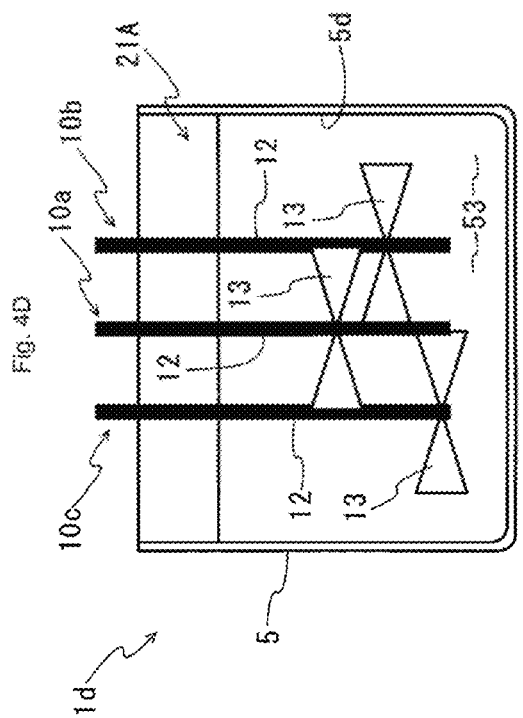
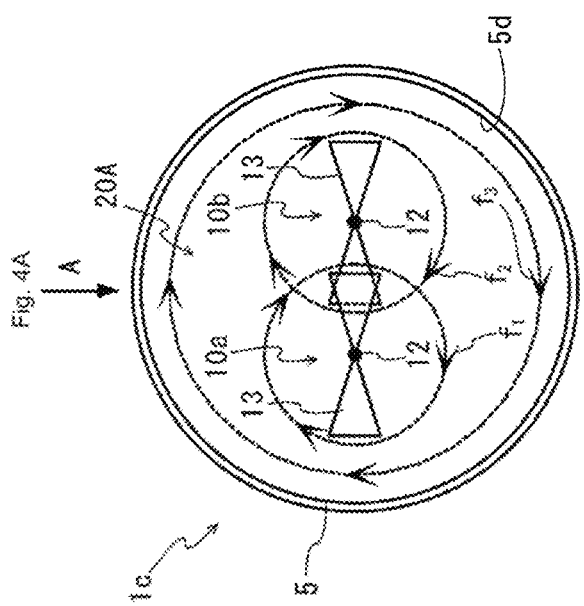
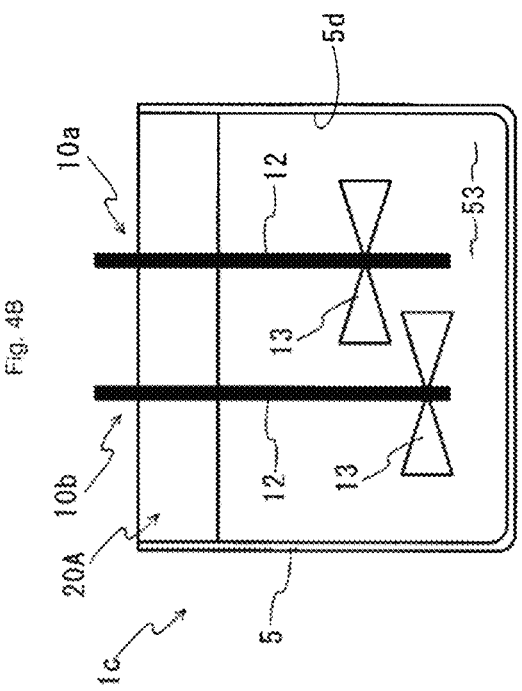

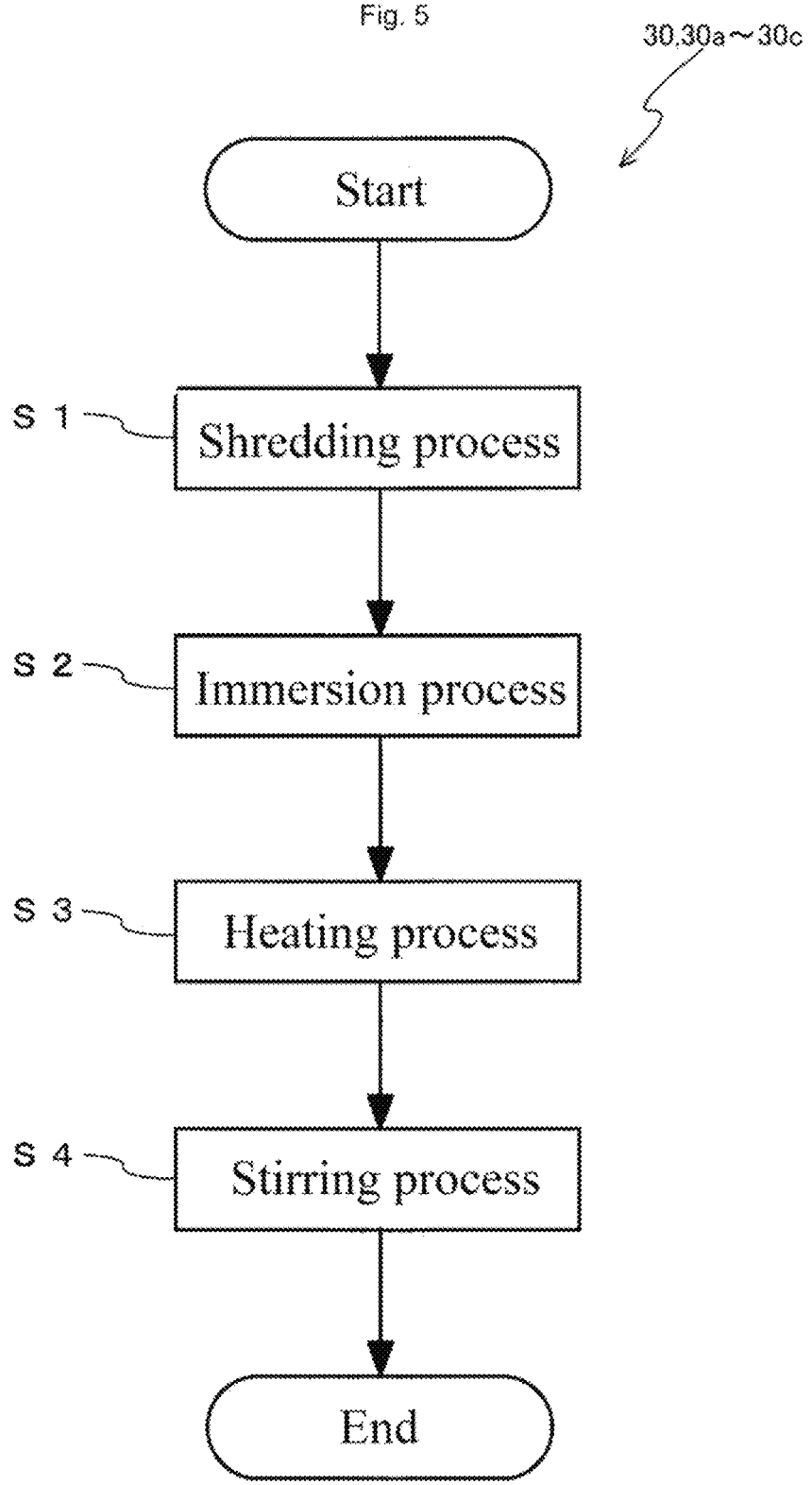

Fig. 6

| Example | Base (color) | Piece size (mm) | Remover | Additive NaOH (wt%) | Immersion condition T₂(°C) | Immersion condition (min.) | Stirring condition T₁(°C) | Stirring condition (min.) | Stirring condition (rpm) | Fins | Results Appearance | Figure |
|---|---|---|---|---|---|---|---|---|---|---|---|---|
| 1 | Uncoated PP material | | BuOH | - | | | | | | - | Swollen, W=99° →91°, E=0.9% | - |
| 1 | Uncoated ABS material | 5 | EtOH | - | | | | | | - | Swollen, W=79° →75°, E=0.8% | - |
| 1 | PP | | BuOH | - | 80 | 60 | | | | - | Swollen, W=93° →82°, E=13% | 7(c)-7(d) |
| 1 | ABS | | EtOH | - | 50 | 60 | | | | - | Swollen, E=10% | 7(g)-7(h) |
| 2 | ABS (silver) | | EtOH | - | 80 | 60 | | | | - | Swollen in 30 min. and softened | 8(a) |
| 2 | ABS (white) | 30 | EtOH | - | 50 | 60 | | | | - | Excellent in 60 min. | 8(f) |
| 2 | PC-ABS (pearl and red) | | EtOH | - | 25 | 30,60 | | | | - | Swollen in 60 min. and softened | 8(g) |
| 2 | PP | | EtOH | - | 25 | 30,60 | | | | - | × | 8(h) |
| 3 | PP | 12 | MeOH | - | 25 | 30,60 | | | | - | ○ | 8(b) |
| 4 | PP | 20 | BuOH | - | - | - | 80,90,100 | 60 | 800 | - | Excellent at not lower than 90 °C | 10(b)-10(c) |
| 5 | PP+Primer | 30 | BuOH | 0.5 | - | - | 90 | 60 | 400 | - | △ | 11(a) |
| 5 | PP+Primer | 30 | BuOH | 0.5 | - | - | 100 | 60 | 250 | - | ○ | 11(b) |
| 6 | PP+Primer | 12 | BuOH | 0.3 | 80 | 5 | 80 | 30,60 | 250 | + | Good in 60 min. | 12(b)-12(c) |
| 6 | PP+Primer | 12 | BuOH | 0.3 | 85 | 5 | 85 | 60 | 850 | + | ◎ | 12(d) |
| 7 | PC-ABS | 12 | BuOH | - | - | - | 100 | 60 | 1000 | - | Excellent: PC slightly dissolved | 13(b) |
| 8 | PC-ABS | 15-20 | MeOH | - | - | - | 55 | 60 | 400 | - | ◎ | 14(b) |
| 9 | ASA | 10 | MeOH | - | - | - | 50 | 60 | 380 | - | ◎ | 15(b) |
| 10 | PC-ABS | 15-20 | MeOH | - | - | - | 55 | 60 | 370 | - | △ | 16(b) |
| 10 | PC-ABS | 15-20 | EtOH | - | - | - | 55 | 60 | 450 | - | ◎ | 16(c) |
| 10 | PC-ABS | 15-20 | BuOH | - | - | - | 60 | 60 | 370 | - | ◎ | 16(d) |
| 11 | ABS | 15-20 | MeOH | - | - | - | 50 | 60 | 250,450 | - | Excellent: ABS surface bleached | 17(b) |
| 11 | ABS | 15-20 | EtOH | - | - | - | 55 | 60 | 250,450 | - | ◎ | 17(c) |
| 11 | ABS | 15-20 | BuOH | - | - | - | 60 | 60 | 250,450 | - | ◎ | 17(d) |
| 11 | ABS | 15-20 | BuOH | - | - | - | 60 | 30 | 450 | - | ◎ | 17(e) |
| 12 | PC-ABS | 30 | MeOH | - | 50 | 10 | 50 | 20 | 800 | + | ◎ | 18(b) |
| 13 | PC-ABS | 30 | EtOH | - | 40 | 5 | 50 | 30 | 800 | + | ◎ | 18(c) |
| 13 | PC-ABS | 30 | MeOH | - | 50 | 5 | 40 | 25 | 800 | + | ◎ | 19(b) |
| 14 | ABS | 30 | EtOH | - | 50 | 10 | 50 | 20 | 800 | + | Excellent: ABS dissolved and coating adhered again | 20(b),20(c) |
| 14 | ABS | 30 | EtOH | - | 40 | 10 | 40 | 20 | 800 | + | Excellent: ABS partially dissolved and coating adhered again | 20(d) |
| 15 | ABS | 30 | MeOH | - | 50 | 5 | 50 | 25 | 800 | + | Excellent: Underlayer left | 20(e) |
| 15 | ABS | 30 | EtOH | - | 40 | 10 | 40 | 20 | 800 | + | Excellent: ABS partially dissolved | 21(b) |
| 15 | ABS | 30 | MeOH+EtOH | - | 40 | 10 | 40 | 20 | 800 | + | ◎ | 21(c) |
| 15 | ABS | | | | | | | | | | | 21(d) |

◎: Excellent: The Coating was completely removed from the base.
○: Good: Some coating was left on the base.
△: Fair: Much coating was left on the base.
×: Poor: The material (coated plastic article) remained unchanged.

METHOD AND DEVICE FOR REMOVING COATING ON COATED PLASTIC ARTICLE

CROSS-REFERENCE TO RELATED APPLICATIONS

The present application is a continuation application of International Patent Application No. PCT/JP2018/038731 filed on Oct. 17, 2018, which claims priority to Japanese Patent Application No. 2017-203991 filed on Oct. 20, 2017, the entire contents of which are incorporated by reference.

BACKGROUND OF INVENTION

Field of the Invention

The present invention relates to a method and a device for removing, with a remover, a coating containing a synthetic resin component on the surface of a plastic base in a coated plastic article, and particularly relates to a method and a device for removing a coating on a coated plastic article with a remover formed from monohydric lower alcohol.

Background Art

Many plastic articles used in vehicle bumpers or interior or exterior parts have their plastic base surfaces coated with a coating formed from a synthetic resin component. To reuse the base, the coating is to be removed from the base.

Examples of a method and a device for removing such a coating include an invention entitled COATING REMOVING METHOD AND COATING REMOVING DEVICE filed by the applicant (Patent Literature 1). The coating removing method described in Patent Literature 1 includes a first process of placing an alkaline remover liquid in a reactor including a heater and a stirrer, a second process of placing a surface-coated substrate in a container and immersing the container in the liquid in the reactor, a third process of heating the alkaline remover liquid with the heater to a temperature not lower than 120° C. and higher by 20 to 40° C. than the melting point of the substrate while stirring the liquid with the stirrer, and a fourth process of cleansing the substrate, from which the coating has been removed by the alkaline remover liquid, removed from the reactor.

The above structure allows efficient removal of a coating from the substrate surface with the stirrer after dividing linkage of a framework of the coating on the substrate surface with an alkaline remover liquid to swell the coating. Moreover, cleansing the substrate after coating removal completely removes the alkaline remover liquid. Thus, the substrate after coating removal is reusable as repellets.

An invention described in Patent Literature 2 entitled DEGRADING REMOVER FOR RESIN COATING AND DEGRADING REMOVING METHOD FOR RESIN COATING is directed to, for example, a degrading removing method for a resin coating capable of degrading and removing a resin coating from resin-coated resin parts without environmental deterioration.

The method for degrading and removing a resin coating described in Patent Literature 2 includes spraying or applying a remover for degrading a resin coating on or to a resin-coated part at a temperature of 50 to 100° C. or immersing the resin-coated part in the degrading remover to degrade and remove the coating resin. The degrading remover contains three components, specifically 8 to 65 wt % of a thiocyanate of alkali metal (IA group), alkaline earth metal (2A group), or quaternary ammonium, 10 to 85 wt % of alcohol having a boiling point at normal atmospheric pressure of not higher than 100° C., and 5 to 60 wt % of water.

Such a method for degrading and removing a resin coating allows chemical degradation of only the coating resin, dissolution of the coating resin with a solvent, and efficient degradation and removal of the resin coating without environmental deterioration.

An invention described in Patent Literature 3 entitled COATING REMOVAL METHOD AND COATING REMOVER is directed to, for example, a method for removing a coating on the surface of a plastic molded product in a short time.

The coating removal method described in Patent Literature 3 includes immersing a surface-coated plastic molded product in a remover containing a liquid mixture of lower alcohol and gasoline as a main component to remove the coating from the surface of the plastic molded product.

Such a coating removal method allows removal of a coating in a short time with a simple device without a special device. The processing with a closed system facilitates reuse of the remover and eliminates disposal of waste fluid, being environmentally and economically useful.

An invention described in Patent Literature 4 entitled METHOD FOR PROCESSING COATED PLASTIC MOLDED BODY AND METHOD FOR RECYCLING THE MOLDED BODY is directed to, for example, a method for processing a coated plastic molded body including degrading, for example, a resin component forming a coating.

The method for processing a coated plastic molded body described in Patent Literature 4 includes placing a partly or entirely surface-coated plastic molded body into contact with an alcoholic solution containing an alkaline alkali metal compound.

Such a method for processing a coated plastic molded body can degrade, for example, a resin component forming a coating by placing the coating on the plastic molded body into contact with an alcoholic solution containing an alkaline alkali metal compound of smaller than or equal to 0.25 mol/L rather than separating and removing the coating from the plastic molded body.

An invention described in Patent Literature 5 entitled COATING REMOVER is directed to a coating remover in which a coating is left at normal temperature for removal in a short time.

The coating remover described in Patent Literature 5 contains a halogenated hydrocarbon of 100 parts by weight, an alcohol solvent of 5 to 20 parts by weight, and an acid of 1 to 15 parts by weight.

Such a coating remover, particularly, a coating remover containing low molecular alcohol and higher alcohol for an alcohol solvent and hydrochloric acid for acid, can naturally remove the coating by allowing the coating to remain in the remover at normal temperature in a short time.

Additionally, known techniques include an invention described in Patent Literature 6 entitled METHOD FOR REMOVING COATING FROM COATED POLYPROPYLENE BUMPER, an invention described in Patent Literature 7 entitled THERMOSETTING COATING REMOVAL METHOD, an invention described in Patent Literature 8 entitled COATING REMOVAL METHOD, METHOD FOR RECYCLING PLASTIC MOLDED PRODUCT, AND REMOVER LIQUID FOR THESE METHODS, an invention described in Patent Literature 9 entitled METHOD FOR RECYCLING VEHICLE RESIN WASTE, an invention described in Patent Literature 10 entitled COATING REMOVER AND COATING REMOVAL METHOD, and an invention described in Patent Literature 11 entitled COATING REMOVER AND COATING REMOVAL METHOD.

CITATION LIST

Patent Literature

Patent Literature 1: Japanese Patent No. 6188068
Patent Literature 2: Japanese Unexamined Patent Application Publication No. 5-9420
Patent Literature 3: Japanese Unexamined Patent Application Publication No. 5-96231
Patent Literature 4: Japanese Unexamined Patent Application Publication No. 6-25570
Patent Literature 5: Japanese Unexamined Patent Application Publication No. 11-80626
Patent Literature 6: Japanese Unexamined Patent Application Publication No. 8-257488
Patent Literature 7: Japanese Unexamined Patent Application Publication No. 2002-179955
Patent Literature 8: Japanese Unexamined Patent Application Publication No. 2005-46770
Patent Literature 9: Japanese Unexamined Patent Application Publication No. 2012-30467
Patent Literature 10: Japanese Unexamined Patent Application Publication No. 2013-40265
Patent Literature 11: Japanese Unexamined Patent Application Publication No. 2013-40266

SUMMARY OF INVENTION

Technical Problem

The technique described in Patent Literature 1 cannot fully remove current coatings with high weather resistance or primer coatings on a base formed from polypropylene (PP) as a main component.

The strong alkali removers with the techniques described in Patent Literatures 2 and 6 contain strong alkali as a main component, and are in a slurry form. The processing with the removers in an open system such as stirring can lack safety, and isolating a coated PP bumper undergoing immersing from the strong alkali remover and cleansing the coated PP bumper can be difficult.

With the techniques described in Patent Literatures 3, 5, 7, 8, 9, 10, and 11, the remover containing a liquid mixture of lower alcohol and gasoline as a main component has lower hydrophilicity than lower alcohol. Due to its composition, acrylonitrile butadiene styrene (ABS) resin may have high hydrophobicity. Thus, the remover containing a liquid mixture of lower alcohol and gasoline as a main component may be unusable for such a base formed from ABS resin.

With the techniques described in Patent Literatures 9 and 10, a solvent heated to 70 to 100° C. and having a hydrogen bond parameter ($\delta h$) of 8 to 13 $(J/cm^3)^{1/2}$ partially dissolves and degrades PP besides ABS.

With the techniques described in Patent Literatures 2, 5, 9, 10, and 11, a compound containing a heteroatom is used as a coating remover, for which subsequent disposal of waste liquid can be difficult.

With the technique described in Patent Literature 4, the processing temperature in a range of 90 to 250° C. is equal to or higher than the boiling point of lower alcohol. Thus, the processing uses a pressure vessel. This technique thus has issues such as an increased device cost, a potential danger from high-pressure processing, and increased energy consumption. Moreover, a PP resin that does not dissolve in low-temperature alcohol dissolves and degrades in such a high-temperature alcoholic solution.

In response to such circumstances, one or more aspects of the invention are directed to a method and a device for removing a coating on a coated plastic article with a remover formed from monohydric lower alcohol. The method and the device allow highly efficient removal of a coating from a coated plastic article while preventing a highly hydrophobic base from dissolving, and allow recovery of the base after coating removal and the remover. With the monohydric lower alcohol heated to a temperature not higher than its boiling point, the method and the device eliminate an expensive apparatus such as a pressure vessel.

Solution to Problem

In response to the above issue, a method according to a first aspect of the present invention is a method for removing a coating on a coated plastic article with a remover. The coating contains a synthetic resin component and is on a surface of a plastic base included in the coated plastic article. The method includes shredding the coated plastic article into a plurality of pieces, heating the remover to a first temperature, and stirring the plurality of pieces with the heated remover. The remover includes at least one monohydric lower alcohol selected from the group consisting of methanol, ethanol, propanol, and 1-butanol, and swells at least one of the base or the coating. The first temperature is not lower than 25° C. and not higher than a temperature that is 10° C. lower than a boiling point of the remover.

The above method for removing a coating on a coated plastic article includes shredding to facilitate, in subsequent stirring, stirring of the coated plastic article in the remover and separating the coating from the base. In subsequent heating, the remover is heated to the first temperature to swell the base, the coating, or the base and the coating. The remover, which is monohydric lower alcohol, is heated to not lower than 25° C. and not higher than a temperature that is 10° C. lower than the boiling point of the remover. Thus, neither the base nor the coating is completely dissolved by the remover.

In the stirring process, the pieces are stirred together with the remover to receive a shearing force of the remover to the end surfaces of the pieces. The coating and the swollen base, the base and the swollen coating, or the swollen base and the swollen coating are rapidly separate from each other. The heating and stirring processes may be performed at different times or the same time.

Propanol herein is a concept including both 1-propanol (common name of propanol) and 2-propanol (common name of isopropanol).

A method according to a second aspect of the present invention is the method according to the first aspect further including immersing the plurality of pieces in the remover heated to a second temperature before the stirring. The second temperature is not higher than an upper limit temperature of the first temperature.

In addition to the effects of the first aspect of the invention, the above method for removing a coating on a coated plastic article facilitates, with the immersion process, swelling of the base, the coating, or the base and the coating in the heating process. The term before the stirring herein includes the immersion process performed before or concurrently with the heating process, or between the heating and stirring processes. The immersion process not performed concurrently with the heating process may have the second temperature that is the same as or different from the first temperature in the heating process unless the second temperature exceeds the upper limit of the first temperature.

A method according to a third aspect of the present invention is the method according to the first or second aspect in which the base is free from polycarbonate and contains polyolefin as a main component, the remover is 1-butanol, and the first temperature is not lower than 70° C. and not higher than a temperature that is 10° C. lower than the boiling point of the remover.

With the above method for removing a coating on a coated plastic article, polyolefin as a main component includes, for example, polyolefin having a weight ratio not lower than 90% to the base. The weight ratio of polyolefin to the base may be larger than the weight ratio of a substance other than polyolefin to the base.

Methanol or ethanol is highly hydrophilic, and thus is unsuitable for swelling the base containing polyolefin as a main component, such as PP, and the coating of the base. In contrast, 1-butanol has lower hydrophilicity than, for example, methanol, and has the highest boiling point (117.5° C.) among other butanol isomers.

Thus, with the above method for removing a coating on a coated plastic article, in addition to the effects of the first or second aspect of the invention, 1-butanol having a first temperature not lower than 70° C. and not higher than 107.5° C. may swell the base formed from polyolefin as a main component.

A method according to a fourth aspect of the present invention is the method according to the first or second aspect in which the base contains acrylonitrile butadiene styrene resin or acrylonitrile styrene acrylate resin, the remover includes one selected from the group consisting of methanol, ethanol, and a mixture of methanol and ethanol, and the first temperature is not lower than 25° C. and not higher than 55° C.

With the above method for removing a coating on a coated plastic article, ABS resin and acrylonitrile styrene acrylate (ASA) resin may be dissolved depending on their compositions with a remover including, for example, higher alcohol heated to a temperature not lower than 50° C. The multiple pieces may thus adhere to each other, disabling separation of the coating from the base.

In contrast, in addition to the effects of the first or second aspect of the invention, the method for removing a coating on a coated plastic article uses, for example, methanol heated to a first temperature not lower than 25° C. and not higher than 55° C. Thus, ABS resin and ASA resin are prevented from dissolving or the pieces are prevented from adhering to each other. Thus, the base and the coating can be separate from each other.

A method according to a fifth aspect of the present invention is the method according to any one of the first to fourth aspects in which the base is free from polycarbonate, polyester, and polyurethane, the remover contains a sodium hydroxide solution, and a sodium hydroxide concentration in the remover is in a range of 0.01 to 0.5 wt %.

With the above method for removing a coating on a coated plastic article, in addition to the effects of any of the first to fourth aspects of the invention, the remover containing a sodium hydroxide solution decomposes a synthetic resin component contained in the coating and facilitates coating removal.

A method according to a sixth aspect of the present invention is the method according to any one of the first to fifth aspects in which the plurality of pieces have a maximum size in a range of 10 to 100 mm.

With the above method for removing a coating on a coated plastic article, in addition to the effects of any of the first to fifth aspects of the invention, the pieces have a maximum size of 10 to 100 mm. The pieces with such sizes facilitate stirring in the stirring process, and a shearing force is effectively applied to the end surfaces of the pieces.

A device according to a seventh aspect of the present invention is a device for removing a coating on a coated plastic article with a remover. The coating contains a synthetic resin component and is on a surface of a plastic base included in the coated plastic article. The device includes a shredder that shreds the coated plastic article into a plurality of pieces, a heater that heats the remover to a first temperature, a reactor that stores the heated remover, and a stirrer located in the reactor to stir the plurality of pieces with the heated remover. The remover includes at least one monohydric lower alcohol selected from the group consisting of methanol, ethanol, propanol, and 1-butanol, and swells at least one of the base or the coating. The first temperature is not lower than 25° C. and not higher than a temperature that is 10° C. lower than a boiling point of the remover.

The above device for removing a coating on a coated plastic article includes, for example, a known shredder, and a heater tightly attached to, for example, the outer peripheral surface of the reactor.

The reactor includes, for example, a cylindrical box container having an opening at the upper edge, and a lid that movably closes the opening to prevent evaporation of the remover. The reactor retains the remover at or under a temperature that is 10° C. lower than the boiling point of the remover, and may have no pressure resistance. The reactor may accommodate a filter container to facilitate removal of the filtered-out pieces from the reactor.

An example of a stirrer includes a motor located above the lid, a rotational shaft having an upper end fixed to the motor and located through the lid into the reactor, and a stir blade located at a lower end of the rotational shaft.

The above device for removing a coating on a coated plastic article has the same effects as the first to fifth aspects of the invention.

A device according to an eighth aspect of the present invention is the device according to the seventh aspect of the present invention in which the reactor includes a cylindrical box container and a fin located on an inner peripheral surface of the container, the fin includes a slope inclined upward in a first direction with respect to a horizontal direction, and the stirrer vortically stirs the remover about a center axis of the container to cause the remover to flow in a second direction opposite to the first direction.

In the above device for removing a coating on a coated plastic article, the stirrer stirs the remover to cause pieces to collide against the fin and receive impact to improve removal of coating compared with the structure without the fin.

In the seventh aspect of the invention, when the stirrer vortically stirs the remover about the center axis of the container, the liquid level of the remover rises from the center axis of the container toward the inner peripheral surface under the centrifugal force. However, in the eighth aspect of the invention, the fin is attached to form a slope inclined upward with respect to the horizontal direction as they extend in the first direction. The remover stirred to flow in a second direction opposite to the first direction can reduce a rise in the liquid level of the remover under the centrifugal force. Beside this, the eighth aspect of the invention has the same effects as the seventh aspect of the invention.

A device according to a ninth aspect of the present invention is the device according to the eighth aspect of the present invention in which the fin is located on an inner surface of a filter container removably accommodated in the container other than the inner peripheral surface of the container, and the filter container includes a filter located on at least part of the filter container to separate the plurality of pieces stirred with the remover from the remover by filtration.

The above device for removing a coating on a coated plastic article has the same effects as the eighth aspect of the invention.

A device according to a tenth aspect of the present invention is the device according to any one of the seventh to ninth aspects of the present invention in which the stirrer includes a plurality of stirring members, the plurality of stirring members each include a motor located above a lid of the reactor, a rotational shaft having an upper end fixed to the motor and located through the lid into the reactor, and a stir blade located at a lower end of the rotational shaft, and each motor rotates the corresponding rotational shaft in the same direction about the rotational shaft.

In addition to the effects of the seventh to ninth aspects of the invention, in the above device for removing a coating on a coated plastic article, each motor rotates the corresponding rotational shaft in the same direction about the rotational shaft. Thus, the vortex flows of the remover formed about these rotational shafts are in the same direction. Thus, multiple flows of the remover collide against each other around their borders. This structure increases the impact applied to the pieces and facilitates coating removal at the position of the remover flows colliding against each other.

Advantageous Effects

As described above, in the first aspect of the invention, monohydric lower alcohol as a remover is heated to a first temperature to allow the base, the coating, or the base and the coating to swell without dissolved by the remover. In the subsequent stirring process, the coating and the swollen base, the base and the swollen coating, or the swollen base and the swollen coating can be fully separate from each other. Thus, the coating can be highly efficiently removed from the coated plastic article without the highly hydrophobic base being dissolved.

The base avoids dissolution. The base after coating removal and the remover can be easily recovered and recycled at a high recovery rate. Monohydric lower alcohol is simply heated to a temperature not higher than a temperature that is 10° C. lower than its boiling point. This eliminates an expensive apparatus such as a pressure vessel, and allows safe operations in the heating and stirring processes.

In the second aspect of the invention, in addition to the advantageous effects of the first aspect, the immersion process facilitates swelling of the base, the coating, or the base and the coating to allow the coating and the base to be separate more efficiently from each other in the stirring process.

In the third aspect of the invention, in addition to the advantageous effects of the first or second aspect, 1-butanol facilitates swelling of the base containing polyolefin as a main component. Thus, the coating can be easily removed with an inexpensive general-purpose remover.

In the fourth aspect of the invention in addition to the advantageous effects of the first or second aspect, when the coated plastic article contains ABS resin and ASA resin, which are easily dissolved by higher alcohol not lower than 50° C., methanol or other substance heated to not higher than 55° C. prevents ABS resin or other material from dissolving or prevents the pieces from adhering to the dissolved portion. Thus, the base containing ABS resin or other material and the coating can be recovered highly efficiently.

In the fifth aspect of the invention, in addition to the advantageous effects of any one of the first to fourth aspects, the remover contains a sodium hydroxide solution to facilitate coating removal. Thus, the remover can completely remove a thin coating hardly removable with monohydric lower alcohol, or a coating in a recess on the base.

In the sixth aspect of the invention, in addition to the advantageous effects of any one of the first to fourth aspects, stirring in the stirring process can be facilitated, and the shearing force can be effectively applied to the end surfaces of the pieces. Thus, the base can be recovered in a short time with a shorter stirring time while the base and the coating are efficiently separate from each other.

In addition to the advantageous effects of the first aspect of the invention, the seventh aspect of the invention has a simple structure including the shredder, the heater, the reactor, and the stirrer. This structure can save cost for installation. Particularly, a reactor without pressure resistance simplifies process operations, in addition to saving cost.

A filter container located in a reactor facilitates mixing of pieces into the remover or removal of the pieces from the remover, and increases convenience.

In addition to the advantageous effects of the seventh aspect of the invention, the eighth aspect of the invention has the effects of improving removal of the coating with impact of the pieces on the fin. The fin reduces a rise in the liquid level of the remover under the centrifugal force and keeps the liquid level of the remover close to the horizontal direction during stirring. Thus, the entire remover can be stirred evenly.

In the ninth aspect of the invention, in addition to the advantageous effects of the eighth aspect, the fin is located on the inner surface of the filter container. Thus, the ninth aspect of the invention including the filter container has the same effects as the eighth aspect of the invention.

In addition to the advantageous effects of any one of the seventh to ninth aspects of the invention, the tenth aspect of the invention includes multiple stirring members to facilitate coating removal at a position of multiple flows of the remover colliding against each other. Thus, a high-quality base from which the coating is completely removed can be recovered. The number of stirring members or the positions of the stirring members located in the reactor can be changed in various manners, and optimum processing conditions can be selected depending on the material of the base, the type of remover, or the temperature to improve versatility.

BRIEF DESCRIPTION OF THE DRAWINGS

FIG. 1A is a schematic diagram of a device for removing a coating on a coated plastic article according to an embodiment of the present invention, and FIG. 1B is a schematic diagram of the coated plastic article.

FIGS. 4A and 4B are a top plan view and a view in a direction indicated by arrow A in FIG. 4A of a stirrer included in a device for removing a coating on a coated plastic article according to a third modification of the embodiment of the present invention, and FIGS. 4C and 4D are a top plan view and a view in a direction indicated by arrow A' in FIG. 4C of a stirrer in a device for removing a coating on a coated plastic article according to a fourth modification of the embodiment of the present invention.

FIG. 5 is a flowchart of a method for removing a coating on a coated plastic article according to an embodiment of the present invention.

FIG. 6 is a table showing experimental conditions and results for examples 1 to 15 of the present invention.

DETAILED DESCRIPTION

Figure 2A:
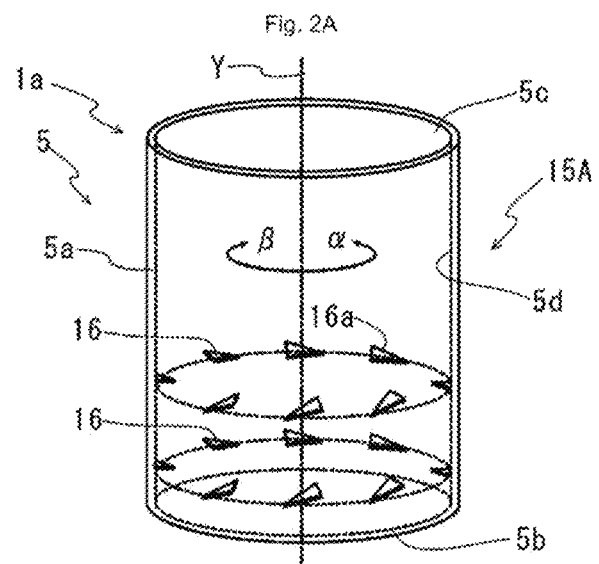
FIG. 2A is a perspective view of a reactor in a device for removing a coating on a coated plastic article according to a first modification of the embodiment of the present invention.

A device for removing a coating on a coated plastic article according to an embodiment of the present invention will now be described in detail with reference to FIGS. 1A to 3B. FIG. 1A is a schematic diagram of a device for removing a coating on a coated plastic article according to an embodiment of the present invention, and FIG. 1B is a schematic diagram of the coated plastic article.

As shown in FIGS. 1A and 1B, a device 1 for removing a coating on a coated plastic article according to an embodiment of the present invention (hereafter, a coating removal device) removes, with a remover 53, a coating 52 containing a synthetic resin component from a coated plastic article 50 having the surface of a plastic base 51 coated with the coating 52.

As shown in FIG. 1A, the coating removal device 1 includes a shredder (not shown) for shredding the coated plastic article 50 into multiple pieces 50a, heaters 2 for heating the remover 53 to a first temperature $T_1$, multiple metal reactors 3A and 3B for storing the heated remover 53, and metal stirrers 4A and 4B located in the reactors 3A and 3B to stir the pieces 50a in the heated remover 53.

The shredder is used in a shredding process in step S1 (described later), and the heaters 2 are used in an immersion process in step S2 and a heating process in step S3. The reactors 3A and 3B are used in the immersion process in step S2 to a stirring process in step S4. The stirrers 4A and 4B are used in the stirring process in step S4.

At least one monohydric lower alcohol is selected from the group consisting of methanol, ethanol, propanol, and 1-butanol as the remover 53 to swell either or both the base 51 and the coating 52.

A first temperature $T_1$ is not lower than 25° C. and not higher than a temperature that is 10° C. lower than the boiling point of the remover 53. More specifically, in the monohydric lower alcohol group, the boiling point is 64.7° C. for methanol, 78.3° C. for ethanol, 97.2° C. for 1-propanol, 82.4° C. for isopropanol, and 117.5° C. for 1-butanol. When the remover 53 includes a mixture containing at least one monohydric lower alcohol, an upper limit is set for the first temperature $T_1$ in accordance with the mixture ratio (weight ratio).

A known shredder is used. The heaters 2 are band heaters tightly attached to the outer peripheral surfaces of the reactors 3A and 3B.

The reactor 3A includes a cylindrical box container 5 and a hemispherical lid 6. The cylindrical box container 5 includes a cylindrical side wall 5a, a bottom 5b, and an opening 5c open at the upper edge of the side wall 5a. The hemispherical lid 6 movably closes the opening 5c to prevent evaporation of the remover 53. The reactor 3B also includes a container 5 and a lid 6. The reactors 3A and 3B retain the remover 53 at or under the maximum temperature that is 10° C. lower than the boiling point of the remover 53, and may have no pressure resistance.

The reactors 3A and 3B are connected to each other at the bottoms 5b of the containers 5 with liquid transport pipes 7a and 7b and a pump 7 between the liquid transport pipes 7a and 7b to transport the remover 53 from the reactor 3A located upstream to the reactor 3B located downstream. A known filtering device 8, which removes impurities including the fine coated plastic articles 50, the base 51, and the coating 52 in the remover 53, is located at the bottom 5b of the reactor 3A with liquid transport pipes 8a and 8b to smoothly transport the remover 53.

In addition, a capacitor 9 and a return pipe 9b are located at a side wall 5a of the reactor 3A adjacent to an opening 5c. The capacitor 9 includes a vent 9a continuous with the outside. The return pipe 9b is continuous with the lower end of the vent 9a. Cooling water W (hatched with oblique dashed lines) circulates around the vent 9a. The return pipe 9b has its lower end open to the side wall 5a.

Vapor of the remover 53 that has risen through the return pipe 9b is cooled and liquefied by the cooling water W. The liquefied remover 53 then flows down the return pipe 9b to the reactor 3A. The vent 9a, the return pipe 9b, and the capacitor 9 are also located on the reactor 3B.

The stirrers 4A and 4B include stirring members 10. Each stirring member 10 includes a motor 11 above the lid 6, a rotational shaft 12, and stir blades 13. The rotational shaft 12 has an upper end 12a fixed to the motor 11, and located through the lid 6 into the reactor 3A. The stir blade 13 is located at a lower end 12b of the rotational shaft 12. The rotational shaft 12 is rotatably held by a lid 6 with a bearing 14.

The coating removal device 1 may also include a filter container accommodated in the containers 5 and used for filtering and separating, from the remover 53, the pieces 50a stirred together with the remover 53.

In the above coating removal device 1, for example, the remover 53 fills the container 5 in the reactor 3A, and is heated with the heater 2 to the first temperature $T_1$, and the shredded pieces 50a are placed into the remover 53 to swell the base 51, the coating 52, or the base 51 and the coating 52. Before stirred, the pieces 50a may be immersed in the remover 53 heated to a second temperature $T_2$ under immersion conditions (second temperature $T_2$ and immersion time) described later.

Subsequently, the pieces 50a are stirred together with the heated remover 53 with the stirring member 10 under the set stirring conditions (first temperature $T_1$, stirring time, and rpm) to separate the coating 52 and the swollen base 51, the base 51 and the swollen coating 52, or the swollen base 51 and the swollen coating 52 from each other. When these parts are fully separate from each other, the base 51 and the coating 52 are removed from the container 5. The removed base 51 and coating 52 are dried with a dryer (not shown) and sorted with a sorter (not shown) for recovering a recycled material of the base 51.

When the base 51 and the coating 52 are not fully separate, the pieces 50a, the base 51, and the coating 52 are removed from the container 5, and placed, without dried, into the remover 53 in advance filling the container 5 in the reactor 3B and heated with the heater 2 to the first temperature $T_1$. Thereafter, stirring with the stirring member 10 is repeated, and the base 51 and the coating 52 fully separate are removed for drying and sorting. Thus, the recycled material of the base 51 can be recovered.

To use the reactor 3B, the used remover 53 is transported from the container 5 in the reactor 3A to the container 5 in the reactor 3B through the liquid transport pipes 7a and 7b and the pump 7. During the transportation, impurities are removed from the remover 53 with the filtering device 8 operating constantly.

As described above, the coating removal device 1 heats monohydric lower alcohol as the remover 53 to the first temperature $T_1$ to allow either or both the base 51 and the coating 52 to swell without dissolved by the remover 53. Stirring with the stirrers 4A and 4B can thus fully separate the unswollen coating 52 and the swollen base 51, the unswollen base 51 and the swollen coating 52, or the swollen base 51 and the swollen coating 52 from each other. The coating 52 can be highly efficiently removed from the coated plastic article 50 without dissolution of the base 51 containing highly hydrophobic acrylonitrile butadiene styrene (ABS) or acrylonitrile styrene acrylate (ASA) resin.

The base 51 and the coating 52 without dissolution facilitate sorting of the base 51 from which the coating 52 is removed, the coating 52, and the remover 53 for recovery. Thus, the base 51 and the remover 53 can be recycled at a high recovery rate.

The reactors 3A and 3B may have no pressure resistance, eliminating an expensive apparatus such as a pressure vessel, and allowing safe heating and stirring of the remover 53.

The pump 7 and the filtering device 8 are also located on the reactors 3A and 3B. When the reactor 3B is also used, the heated remover 53 used in the reactor 3A can be also smoothly and continuously transported to the reactor 3B. This structure thus reduces the workload in transportation, saving the operation time and heat energy, and can thus increase the operation efficiency and reduce the operation cost. In addition, the capacitors 9 are located on the containers 5 in the reactors 3A and 3B to further increase the recovery efficiency of the remover 53.

Figure 2B:
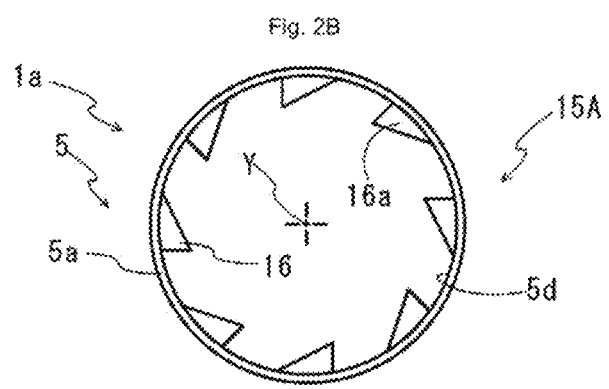
FIG. 2B is a top plan view of the reactor.
Figure 2C:
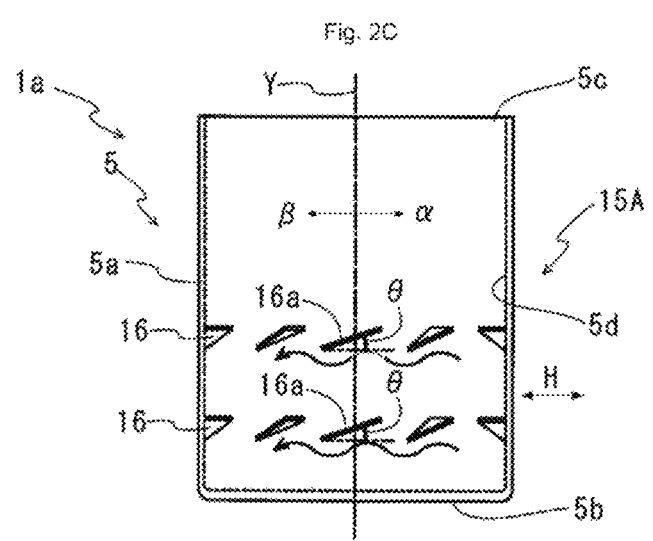
FIG. 2C is a side view of the reactor.

A coating removal device according to a first modification of the embodiment of the present invention will now be described with reference to FIGS. 2A to 2C. FIG. 2A is a perspective view of a reactor in a device for removing a coating on a coated plastic article according to a first modification of the embodiment of the present invention. FIG. 2B is a top plan view of the reactor, and FIG. 2C is a side view of the reactor. The components in FIGS. 1A and 1B are given the same reference numerals in FIGS. 2A to 2C and will not be described. The components other than the container are not shown.

A coating removal device 1a according to a first modification of the coating removal device 1 includes reactors 15A and 15B, instead of the reactors 3A and 3B. The reactor 15B, which has the same structure as the reactor 15A, is not shown. The reactor 3B may not necessarily be replaced with the reactor 15B. The coating removal device 1a excluding the reactors has the same structure as the coating removal device 1.

As shown in FIGS. 2A to 2C, the reactor 15A includes a cylindrical container 5 and multiple fins 16 on an inner peripheral surface 5d of the container 5. The reactor 15A includes eight fins 16 equally spaced along the circumference of the container 5. In the same manner as the reactor 15A, the reactor 15B also includes eight fins 16 equally spaced along the circumference of the container 5.

The fins 16 are each attached to form a slope 16a inclined upward in a first direction α with respect to the horizontal direction H at an angle θ (θ>0 degrees). The angle θ is about 15 degrees. Each of the fins 16 is a flat metal plate having a substantially acute triangular shape in a plan view. The end surface corresponding to its adjacent side is welded and fixed to the inner peripheral surface 5d of the container 5 in the reactor 15A. The reactors 15A and 15B excluding the fins have the same structure as the reactors 3A and 3B.

The stirrers 4A and 4B (refer to FIG. 1A) rotate the rotational shaft 12 to vertically stir the remover 53 about a center axis Y of the container 5 to cause the remover 53 to flow in a second direction β opposite to the first direction α.

Then, the pieces 50a collide against the fins 16 and receive impact to improve removal of the coating 52 compared with the structure without the fins 16. As in the coating removal device 1, in the structure without the fins 16 attached to the inner peripheral surface 5d of the container 5, the liquid level of the remover 53 rises from the center axis Y of the container 5 toward the inner peripheral surface 5d under the centrifugal force in the remover 53. In the structure with the fins 16 causing the remover 53 to flow in the direction β, the remover 53 collides against the back surfaces of the fins 16. The flow direction of the remover 53 is thus changed slightly downward along the back surfaces of the slopes 16a (as indicated with arrows in FIG. 2C) to reduce a rise in the liquid level of the remover 53 under the centrifugal force. The other effects of the coating removal device la are the same as those of the coating removal device 1.

As described above, the coating removal device la causes the pieces 50a to collide against the fins 16, and thus improves removal of the coating 52. The coating removal device la also reduces a rise in the liquid level of the remover 53 and keeps the liquid level of the remover 53 close to the horizontal direction during stirring. The coating removal device la can thus evenly stir the entire remover 53 to uniformly remove the coating 52 from the pieces 50a and improve the uniformity of the recycled base 51. The other advantageous effects of the coating removal device la are the same as those of the coating removal device 1.

Figure 3A:
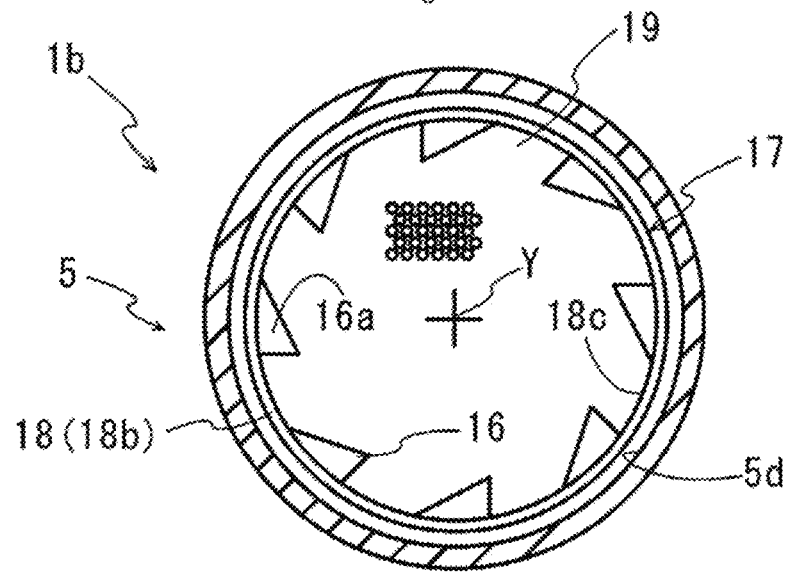
FIGS. 3A and 3B are a top plan view and a side view of a reactor in a device for removing a coating on a coated plastic article according to a second modification of the embodiment of the present invention.
Figure 3B:
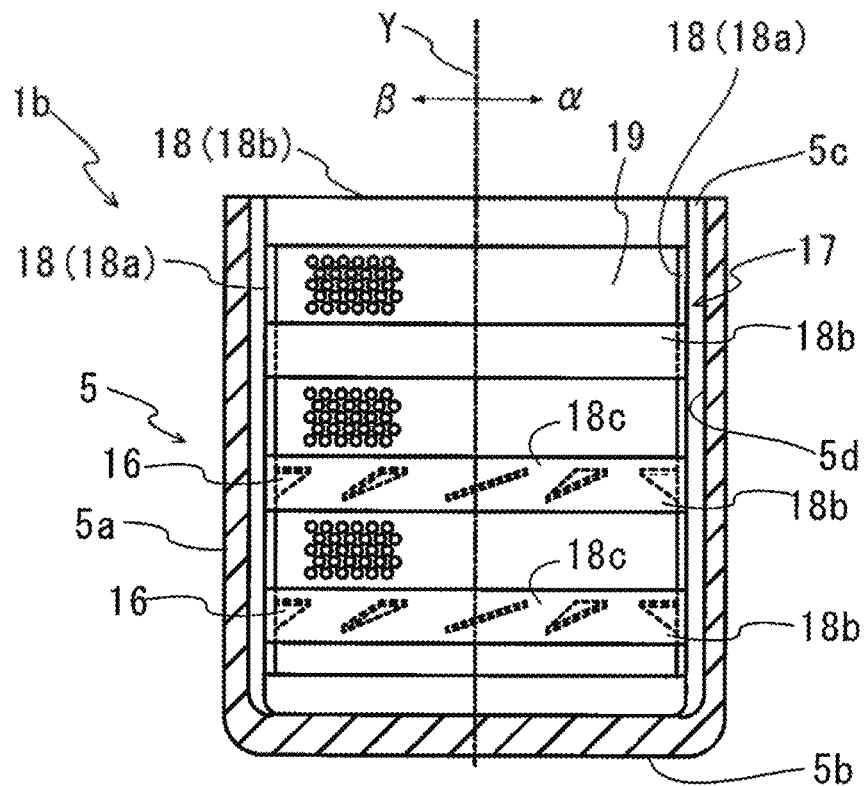

A coating removal device according to a second modification of the embodiment of the present invention will be described with reference to FIGS. 3A and 3B. FIGS. 3A and 3B are a top plan view and a side view of the reactor in a device for removing a coating on a coated plastic article according to a second modification of the embodiment of the present invention.

The components in FIGS. 1A to 2C are given the same reference numerals in FIGS. 3A and 3B and will not be described. The components other than the containers are not shown.

A coating removal device 1b according to a second modification of the coating removal device 1 additionally includes a filter container 17 receivable by the containers 5 in the reactors 3A and 3B (refer to FIG. 1A).

As shown in FIGS. 3A and 3B, the fins 16 are arranged on an inner surface of the filter container 17 removably accommodated in the container 5 other than the inner peripheral surface 5d of the container 5.

More specifically, the filter container 17 includes a metal frame 18, and a filter 19 bonded to at least part of the frame 18 to separate the pieces 50a stirred with the remover 53 from the remover 53. The frame 18 includes multiple bars 18a circumferentially arranged around the center axis Y and multiple rings 18b welded to the bars 18a to be perpendicular to the center axis Y and arranged in parallel to the center axis Y. The filter 19 is a punched metal sheet with multiple perforations.

The eight fins 16 are equally spaced along the circumference of the container 5 with respect to the center axis Y of the container 5. In the same manner as the reactor 3A, the eight fins 16 are equally spaced along the circumference of the filter container 17 in the reactor 3B. The fins 16 are arranged on inner surfaces 18c of two of the rings 18b except the uppermost and lowermost rings. The other components of the coating removal device lb are the same as those of the coating removal device la. The advantageous effects of the coating removal device 1b are the same as those of the coating removal device 1a.

Subsequently, coating removal devices according to third and fourth modifications of the embodiment of the present invention will be described with reference to FIGS. 4A to 4D. FIGS. 4A and 4B are a top plan view and a view in a direction indicated by arrow A in FIG. 4A of a stirrer included in a device for removing a coating on a coated plastic article according to a third modification of the embodiment of the present invention. FIGS. 4C and 4D are a top plan view and a view in a direction indicated by arrow A' in FIG. 4C of a stirrer in a device for removing a coating on a coated plastic article according to a fourth modification of the embodiment of the present invention. The components in FIGS. 1A to 3B are given the same reference numerals in FIGS. 4A to 4D and will not be described. The components other than the containers are not shown.

As shown in FIG. 4A, a coating removal device 1c according to a third modification of the embodiment of the present invention includes a stirrer 20A instead of the stirrer 4A of the coating removal device 1. The stirrer 4B may or may not be replaced with the stirrer 20A.

The stirrer 20A includes stirring members 10a and 10b. The stirring members 10a and 10b each have the same structure as the stirring member 10 in the coating removal device 1. Thus, the stirrer 20A includes two motors 11 (refer to FIG. 1A), two rotational shafts 12, and two pairs of stir blades 13 arranged at different heights in the container 5. Although not shown, the two rotational shafts 12 are held by a lid 6 (refer to FIG. 1A) with two bearings 14.

The two motors 11 rotate the corresponding two rotational shafts 12 in the same direction about the rotational shafts 12. The other components of the coating removal device 1c are the same as those of the coating removal device 1.

In the coating removal device 1c, vortex flows $f_1$ and $f_2$ of the remover 53 formed about the two rotational shafts 12 are in the same direction. The flows $f_1$ and $f_2$ of the remover thus collide against each other around their borders and change their flow directions.

Around the inner peripheral surface 5d of the container 5, flows of the remover 53 are in the same direction, and merge in one flow $f_3$ along the inner peripheral surface 5d. The structure including the fins 16 on the inner peripheral surface 5d or on the filter container 17 can also reduce a rise in the liquid level of the remover 53 using the fins 16.

Thus, at the position of the flows $f_1$ and $f_2$ of the remover 53 colliding against each other to change their flow directions, the impact applied to the pieces 50a increases and facilitates removal of the coating 52. The other effects of the coating removal device 1c are the same as those of the coating removal device 1.

As described above, the coating removal device 1c facilitates removal of the coating 52 at the position of the flows $f_1$ and $f_2$ of the remover 53 colliding against each other to completely remove the coating 52. The coating removal device 1c can thus recover the base 51 with high quality. The other advantageous effects of the coating removal device 1c are the same as those of the coating removal device 1.

As shown in FIG. 4D, the coating removal device 1d according to a fourth modification of the embodiment of the present invention includes a stirrer 21A instead of the stirrer 4A of the coating removal device 1. The stirrer 4B may or may not be replaced with the stirrer 21A.

The stirrer 21A includes stirring members 10a to 10c. The stirring members 10a to 10c have the same structure as the stirring member 10 in the coating removal device 1, and are each held by the lid 6 with the bearing 14. Thus, the three motors 11 rotate the corresponding three rotational shafts 12 in the same direction about the rotational shafts 12. The other components of the coating removal device 1d are the same as those of the coating removal device 1.

In the coating removal device 1d, vortex flows $f_4$ to $f_6$ of the remover 53 about the respective three rotational shafts 12 are in the same direction. Thus, the flows $f_4$ to $f_6$ of the remover collide against one another around their borders, but merge in one flow $f_7$ along the inner peripheral surface 5d around the inner peripheral surface 5d of the container 5.

This structure can thus facilitate removal of the coating 52 at the position of the flows $f_4$ to $f_6$ of the remover 53 colliding against one another to completely remove the coating 52. The coating removal device ld can thus recover the base 51 with high quality. The other advantageous effects of the coating removal device 1d are the same as those of the coating removal device 1.

A method for removing a coating on a coated plastic article according to an embodiment of the present invention will be described in detail with reference to FIG. 5. FIG. 5 is a flowchart of a method for removing a coating on a coated plastic article according to an embodiment of the present invention. The reference numerals of the components in each paragraph correspond to those of the components in FIGS. 1A to 4D, and those components will not be described.

As shown in FIG. 5, a method 30 for removing a coating on a coated plastic article according to an embodiment of the present invention (hereafter, a coating removal method) is a method for removing, with the remover 53, a coating 52 containing a synthetic resin component to coat the surface of a plastic base 51 of a coated plastic article 50. The coating removal method 30 includes a shredding process in step S1, an immersion process in step S2, a heating process in step S3, and a stirring process in step S4. The coating removal method 30 may eliminate the immersion process in step S2. The heating process in step S3 and the immersion process in step S2 may be performed in the opposite order.

Examples of the remover 53 include at least one monohydric lower alcohol selected from the group consisting of methanol, ethanol, propanol, and 1-butanol. The remover 53 swells either or both the base 51 and the coating 52.

The shredding process in step S1 includes shredding of the coated plastic article 50 into multiple pieces 50a with a known shredder. The pieces 50a have a maximum size in a range of 10 to 100 mm.

The pieces 50a of such a size are obtained by, for example, shredding the coated plastic article 50 as a material with a shredder and selected with, for example, a screen including a sieve mesh with a size of 10 to 100 mm.

The present process facilitates stirring of the coated plastic article 50 in the remover 53 and separation of the coating 52 from the base 51 in the stirring process in step S4.

The immersion process in step S2 includes immersing of the pieces 50a in the remover 53 stored in the reactor 3A and heated to a second temperature $T_2$. The pieces 50a are accommodated in the filter container 17 for immersion in the container 5.

The second temperature $T_2$ is lower than the upper limit of the first temperature $T_1$ (described below).

The heating process in step S3 includes heating of the remover 53 stored in the reactor 3A to the first temperature $T_1$ with the heater 2. The first temperature $T_1$ is not lower than 25° C. and not higher than a temperature that is 10° C. lower than the boiling point of the remover 53.

In this process, the base 51, the coating 52, or the base 51 and the coating 52 are fully swollen. The remover 53, which is monohydric lower alcohol, is heated to not lower than 25° C. and not higher than a temperature that is 10° C. lower than the boiling point of the remover 53. Thus, neither the base 51 nor the coating 52 is completely dissolved by the remover 53. The same effects are obtained in the immersion process in step S2.

The stirring process in step S4 includes stirring of the pieces 50a in the heated remover 53 using the stirrer 4A.

In this process, the pieces 50a are stirred together with the remover 53 to receive a shearing force of the remover 53 to the end surfaces of the pieces 50a. The coating 52 and the swollen base 51, the base 51 and the swollen coating 52, or the swollen base 51 and the swollen coating 52 are expected to rapidly separate from each other.

However, when the base 51 and the coating 52 cannot be fully separate from each other in a predetermined stirring time, the stirring time may be extended while the base 51 and the coating 52 remain in the reactor 3A, or from the immersion process in step S2 to the stirring process in step S4 may be repeated. Instead, the heating process in step S3 and the stirring process in step S4 may be repeated while the reactor 3B is used additionally.

The coating removal method 30 includes coating removal methods 30a to 30c described below.

Among the coating removal methods 30a to 30c, the coating removal method 30a is used for the base 51 is free from polycarbonate and contains polyolefin as a main component, and uses the remover 53 including 1-butanol, and the first temperature $T_1$ of not lower than 70° C. and not higher than a temperature that is 10° C. lower than the boiling point of the remover 53.

The coating removal method 30b is used for the base 51 containing ABS or ASA resin and uses the remover 53 including one selected from the group consisting of methanol, ethanol, and a mixture of methanol and ethanol, and the first temperature $T_1$ is not lower than 25° C. and not higher than 55° C.

The coating removal method 30c is used for the base 51 free from polycarbonate, polyester, and polyurethane, and uses the remover 53 containing a sodium hydroxide solution and a sodium hydroxide concentration in the remover 53 is in a range of 0.01 to 0.5 wt %.

Among examples 1 to 15 described below, examples 1 and 2 include no stirring process in step S4, and example 3 uses a pressure vessel. Example 3 corresponds to none of the coating removal methods 30 and 30a to 30c. As shown in FIG. 6 described later, example 4, the top row of example 5, and the top row of example 6 correspond to at least the coating removal method 30a, and examples 8 and 9, the top and middle rows of example 10, the top and second rows of example 11, and examples 12 to 15 correspond to at least the coating removal method 30b. The bottom rows of example 5 and 6 correspond to at least the coating removal method 30c. The example 7, the bottom row of example 10, the third and bottom rows of example 11 correspond to the coating removal method 30.

The structure of a specific example will now be described with reference to FIG. 6. FIG. 6 is a table showing the experimental conditions and results for examples 1 to 15 of the present invention. The examples do not limit the scope of the present invention.

As shown in FIG. 6, the results for the examples were rated by visually inspecting the appearance of the recycled base 51 using the criteria below.

Excellent: The coating was completely removed from the base.

Good: A little coating was left on the base.

Fair: Much coating was left on the base.

Poor: The material (coated plastic article) remained unchanged.

EXAMPLE 1

An example using a device for removing a coating on a coated plastic article according to an embodiment of the present invention will be described with reference to FIGS. 7A to 7H. FIGS. 7A to 7H are photographs of an actual coated plastic raw material and an actual base after coating removal according to example 1 of the present invention.

An uncoated PP material (not shown) formed from simply a base was immersed in a 1-butanol remover under immersion condition (1) at a second temperature $T_2$ of 80° C. for 60 minutes. The resulting PP material was swollen, for which a contact angle W and a linear expansion coefficient E were obtained. The contact angle W (degree) herein is an angle between the liquid level and a vessel wall at a point of contact of the free surface of a stationary liquid with the vessel wall. More specifically, water is used as a stationary liquid. The linear expansion coefficient E (%) was calculated with $[(b-a)/a] \times 100$, where a is the length of an unswollen object and b is the length of a swollen object.

Similarly, an uncoated ABS material (not shown) formed from simply a base was immersed in an ethanol remover under immersion condition (2) at a second temperature $T_2$ of 50° C. for 60 minutes. The resulting ABS material was swollen, for which a contact angle W and a linear expansion coefficient E were obtained. Industrial alcohol containing 1-propanol of about 10 wt % and methanol of about 5 wt % was used as ethanol for its operation costs. The same applies to the following examples.

Thus, the contact angle of the PP material was 99° before immersion and 91° after immersion. The contact angle of the ABS material was 79° before immersion and 75° after immersion. The two materials both showed improved hydrophilicity. The PP material was swollen by a linear expansion coefficient of 0.9%. The ABS material was swollen by a linear expansion coefficient of 0.8%. The results show that the PP material and the ABS material are swollen by 1-butanol and ethanol.

Figure 7A:
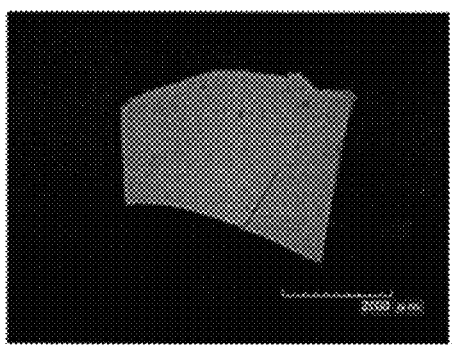
FIGS. 7A, 7B, 7C, 7D, 7E, 7F, 7G, and 7H are photographs of an actual coated plastic raw material and an actual base after coating removal according to example 1 of the present invention.
Figure 7B:
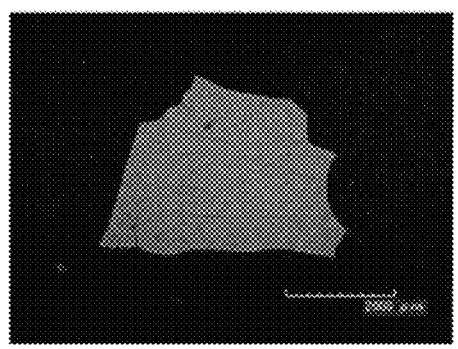
Figure 7C:
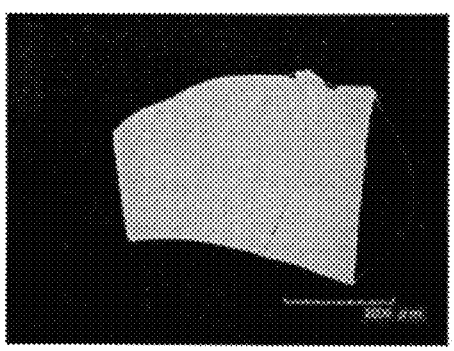
Figure 7D:
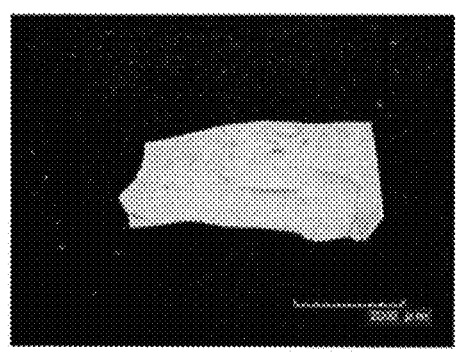
Figure 7E:
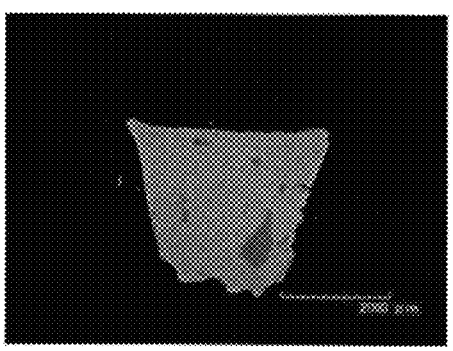
Figure 7F:
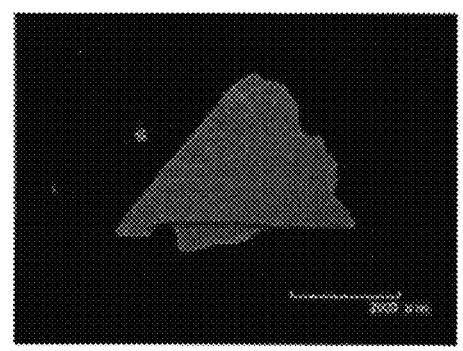
Figure 7G:
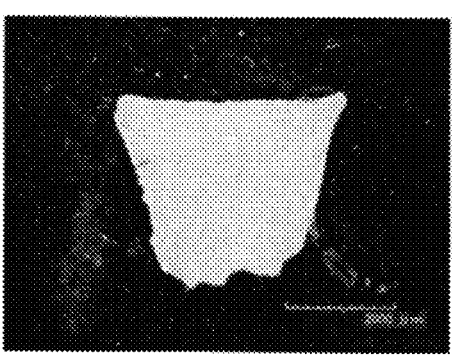
Figure 7H:
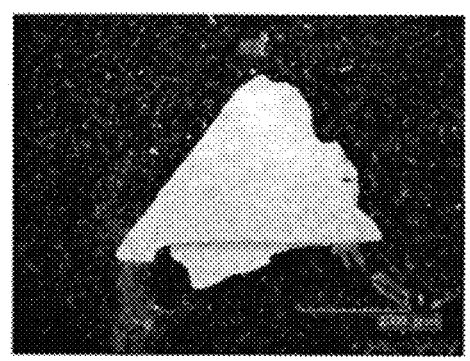

After the coated pieces of a PP bumper shown in FIGS. 7A and 7B were immersed similarly under the immersion condition (1), the contact angle was 93° before immersion and 82° after immersion, and the coated pieces were swollen by a linear expansion coefficient of 13% (refer to FIGS. 7C and 7D). After the coated pieces of a coated ABS product shown in FIGS. 7E and 7F were immersed similarly under the immersion condition (2), the coated pieces were swollen by a linear expansion coefficient of 10% (refer to FIGS. 7G and 7H).

EXAMPLE 2

An example using the device for removing a coating on a coated plastic article according to an embodiment of the present invention will be described with reference to FIGS. 8A to 8H. FIGS. 8A to 8H are photographs of an actual coated plastic raw material and a base after coating removal according to example 2 of the present invention.

Figure 8E:
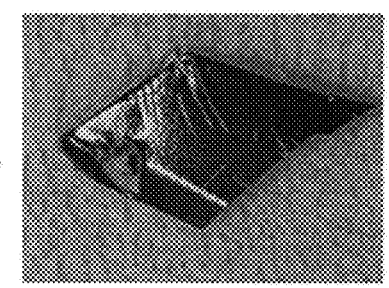
FIGS. 8A, 8B, 8C, 8D, 8E, 8F, 8G, and 8H are photographs of an actual coated plastic raw material and a base after coating removal according to example 2 of the present invention.
Figure 8D:
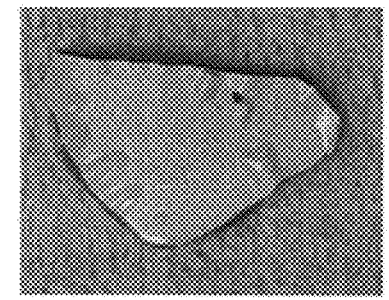
Figure 8C:
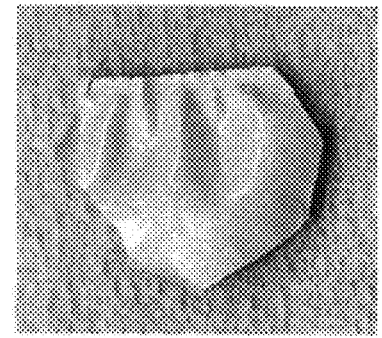
Figure 8B:
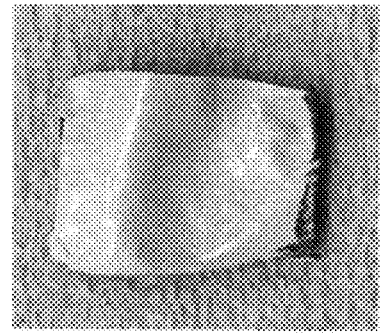
Figure 8A:
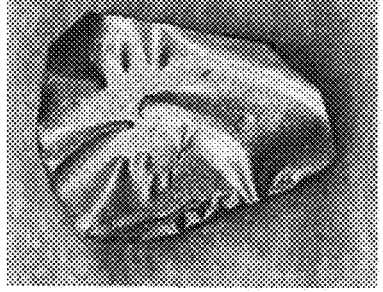
Figure 8H:
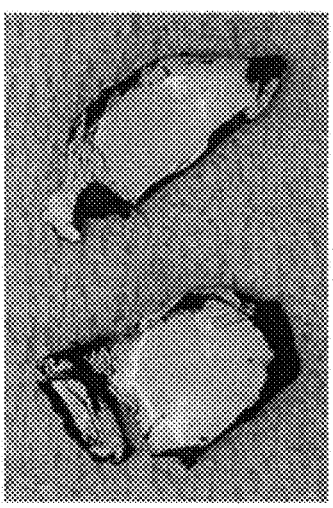
Figure 8G:
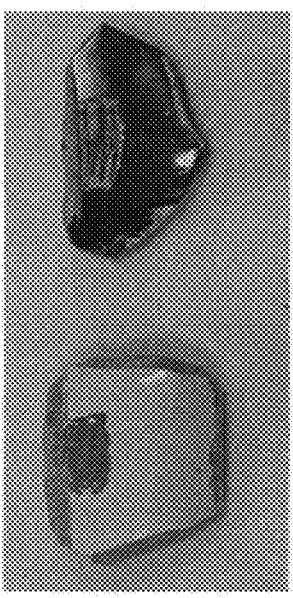
Figure 8F:
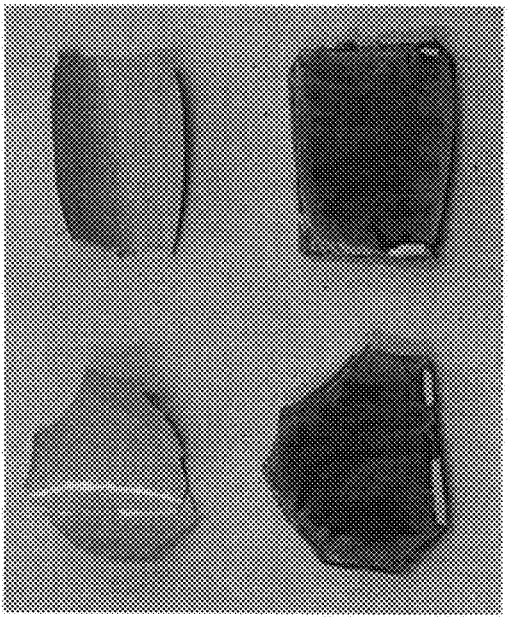

The coated pieces of an ABS material (silver coated) shown in FIG. 8A, the coated pieces of an ABS material (white coated) shown in FIGS. 8B and 8C, the coated pieces of a polycarbonate (PC)-ABS material (pearl and red coated) shown in FIGS. 8D and 8E, and the coated pieces (not shown) of a PP bumper were immersed in an ethanol remover under the immersion conditions at a second temperature $T_2$ of 25° C. for 30 or 60 minutes. The resulting coated pieces of the ABS material (silver coated) were swollen and softened after 30-minute immersion (not shown). As shown in FIG. 8F, the coating of the coated pieces of the ABS material (white coated) was completely removed after 60-minute immersion, and the coating of the coated pieces of the PC-ABS material (pearl and red coated) was swollen after 60-minute immersion as shown in FIG. 8G, and softened enough to be scratchable off by fingernails. However, as shown in FIG. 8H, the coated pieces of the PP bumper had no change after 60-minute immersion.

EXAMPLE 3

Figure 9A:
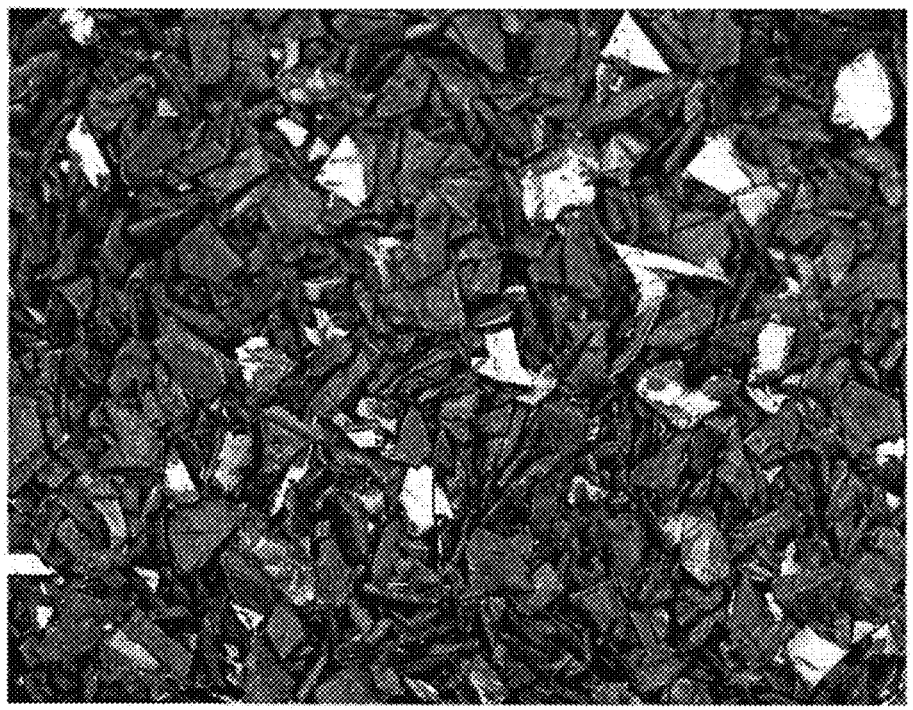
FIGS. 9A and 9B are photographs of an actual coated plastic raw material and an actual base after coating removal according to example 3 of the present invention.
Figure 9B:

An example including heating of a remover using a known pressure vessel will be described with reference to FIGS. 9A and 9B. FIGS. 9A and 9B are photographs of an actual coated plastic raw material and an actual base after coating removal according to example 3 of the present invention.

First, 200 g of coated pieces of a PP bumper (company A) each with a size of 12 mm shown in FIG. 9A was placed into 500 ml of a methanol remover stored in a pressure vessel with a capacity of 1000 ml, and stirred at 100° C., which is equal to or higher than the boiling point of methanol, for 60 minutes at 800 rpm. As shown in FIG. 9B, the coating was not completely removed with a little left on the base. The pressure vessel is used only in the present example.

EXAMPLE 4

An example using the device for removing a coating on a coated plastic article according to an embodiment of the present invention will be described with reference to FIGS. 10A to 10D.

FIGS. 10A to 10D are photographs of an actual coated plastic raw material and an actual base after coating removal according to example 4 of the present invention.

Figure 10A:
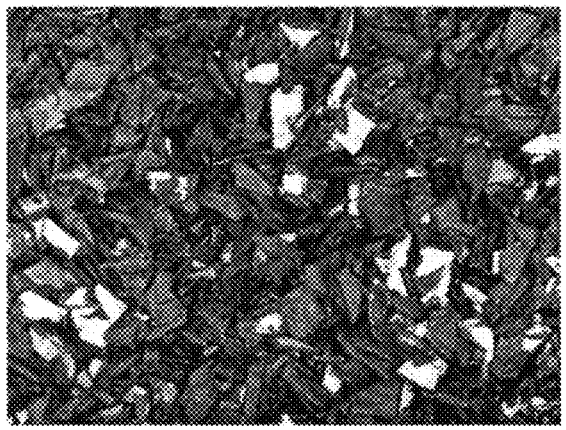
FIGS. 10A, 10B, 10C, and 10D are photographs of an actual coated plastic raw material and an actual base after coating removal according to example 4 of the present invention.
Figure 10B:
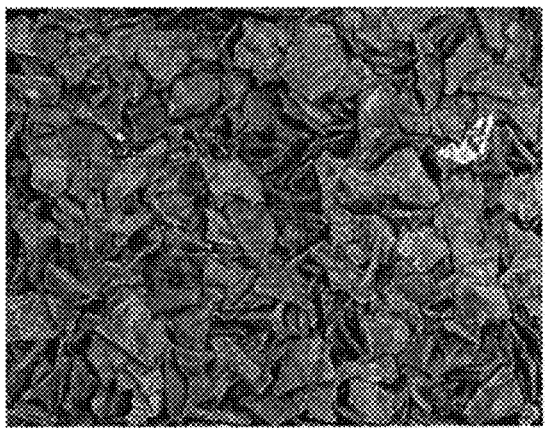
Figure 10C:
Figure 10D:

First, 200 g of coated pieces of a PP bumper (company A) each with a size of 12 mm shown in FIG. 10A was placed into 650 ml of a 1-butanol remover, and stirred at a first temperature $T_1$ of 80° C., 90° C., or 100° C., for 60 minutes at 400 rpm. As shown in FIGS. 10B to 10D, the coating was not completely removed with a little left on the base at 80° C., whereas the coating was almost completely removed at 90 and 100° C.

EXAMPLE 5

Figure 11A:
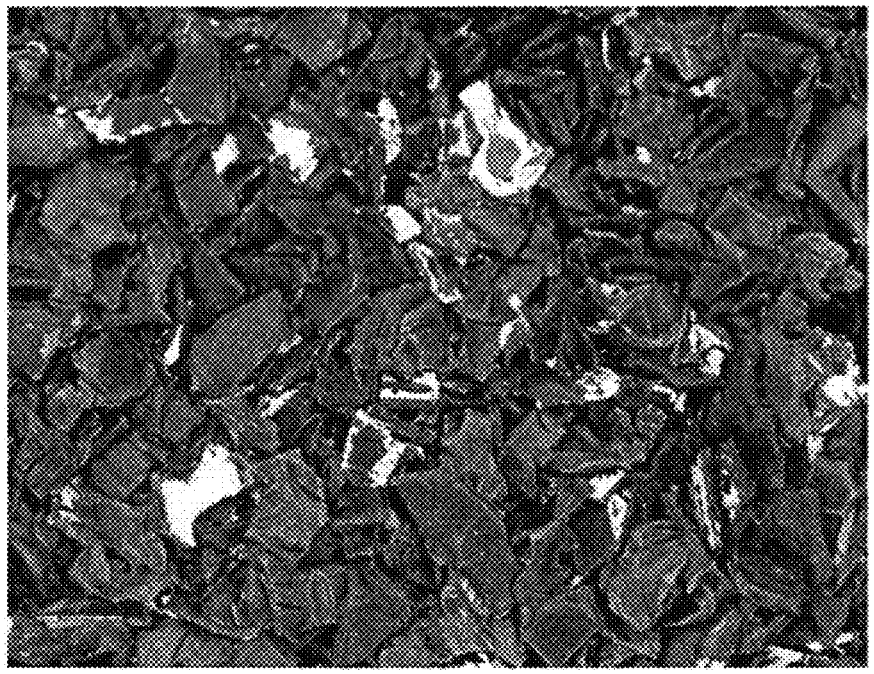
FIGS. 11A and 11B are actual photographs of a base after coating removal according to example 5 of the present invention.
Figure 11B:
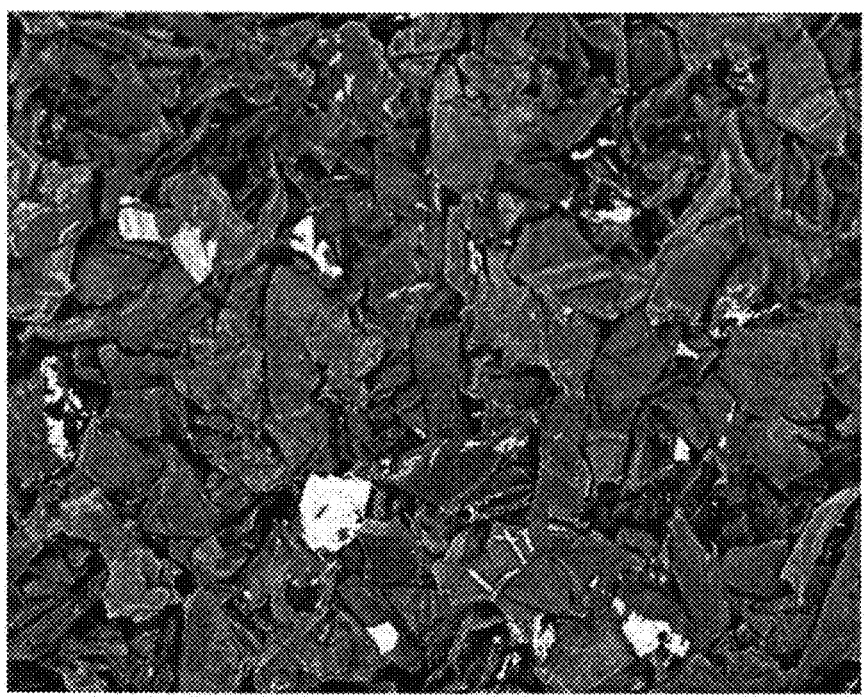

An example using the device for removing a coating on a coated plastic article according to an embodiment of the present invention will be described with reference to FIGS. 11A and 11B. FIGS. 11A and 11B are actual photographs of a base after coating removal according to example 5 of the present invention.

First, 200 g of coated pieces of a PP bumper (coated with primer coating, not shown) (company B) each with a size of 30 mm was placed into 1200 ml of a 1-butanol remover, and stirred at a first temperature $T_1$ of 90 or 100° C., for 60 minutes at 250 rpm with a stirrer. As shown in FIG. 11A, much coating was left on the base at 90° C. and the removed coating adhered to the base. In contrast, as shown in FIG. 11B, when a sodium hydroxide solution was added to the 1-butanol remover to change the sodium hydroxide concentration contained in the 1-butanol remover to 0.5 wt %, and the first temperature $T_1$ was heated to 100° C., the coating was removed with a little left on the base.

EXAMPLE 6

An example using the device for removing a coating on a coated plastic article according to an embodiment of the present invention will be described with reference to FIGS. 12A to 12D. FIGS. 12A to 12D are photographs of an actual coated plastic raw material and an actual base after coating removal according to example 6 of the present invention. The present example uses the filter container 17 with the fins 16 described above.

Figure 12A:
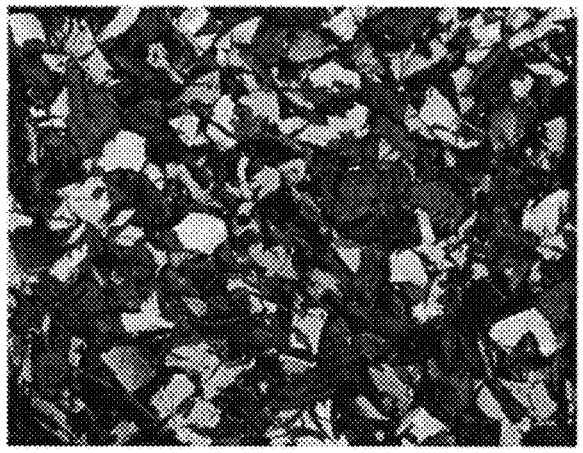
FIGS. 12A, 12B, 12C, and 12D are photographs of an actual coated plastic raw material and an actual base after coating removal according to example 6 of the present invention.
Figure 12B:
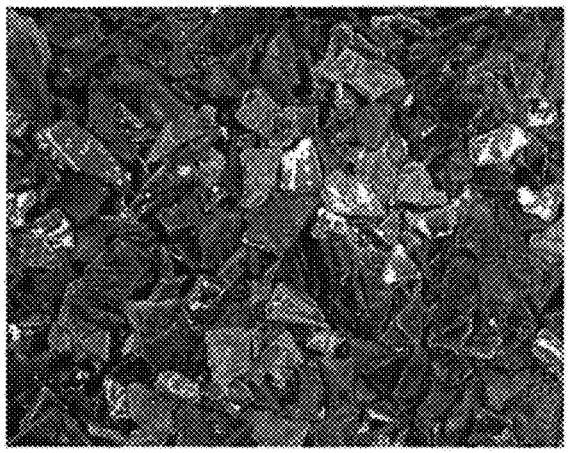
Figure 12C:
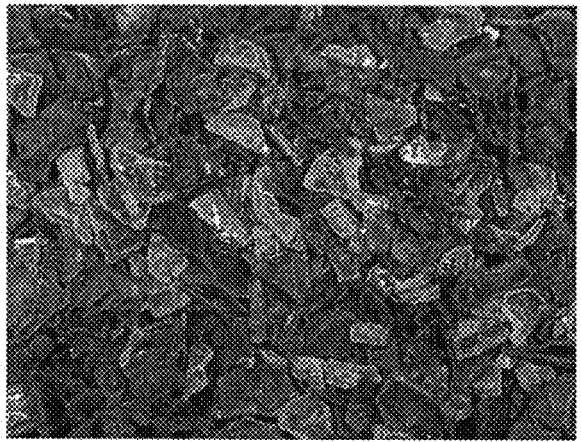

First, 300 g of coated pieces of a PP bumper (coated with primer coating) (company B) each with a size of 12 mm shown in FIG. 12A was placed into 1400 ml of a 1-butanol remover, immersed in the remover at a second temperature $T_2$ of 80° C. for five minutes, and stirred at a first temperature $T_1$ of 80° C. for 30 or 60 minutes at 850 rpm. As shown in FIG. 12B, much coating was left on the base after stirring for 30 minutes. In contrast, as shown in FIG. 12C, the coating was removed with a little left on the base after stirring for 60 minutes.

Figure 12D:
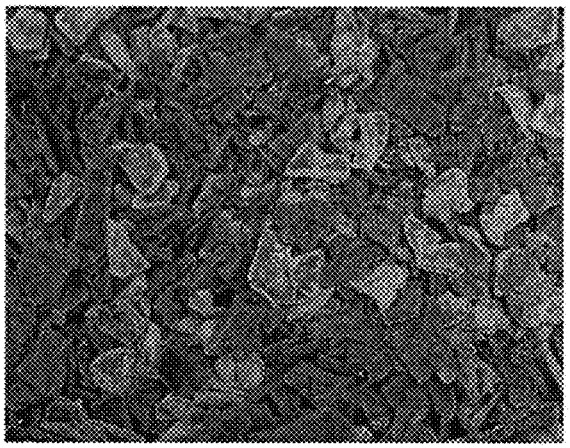

First, 300 g of coated pieces shown in FIG. 12A was placed into 1400 ml of a 1-butanol remover, immersed in the remover at a second temperature $T_2$ of 85° C. for five minutes, and stirred at a first temperature $T_1$ of 85° C. for 60 minutes at 1000 rpm. A sodium hydroxide solution was added to the 1-butanol remover to adjust the sodium hydroxide concentration contained in the 1-butanol remover to 0.3 wt %. As shown in FIG. 12D, the coating was completely removed. However, the swollen surface of the base was abraded and roughened.

EXAMPLE 7

Figure 13A:
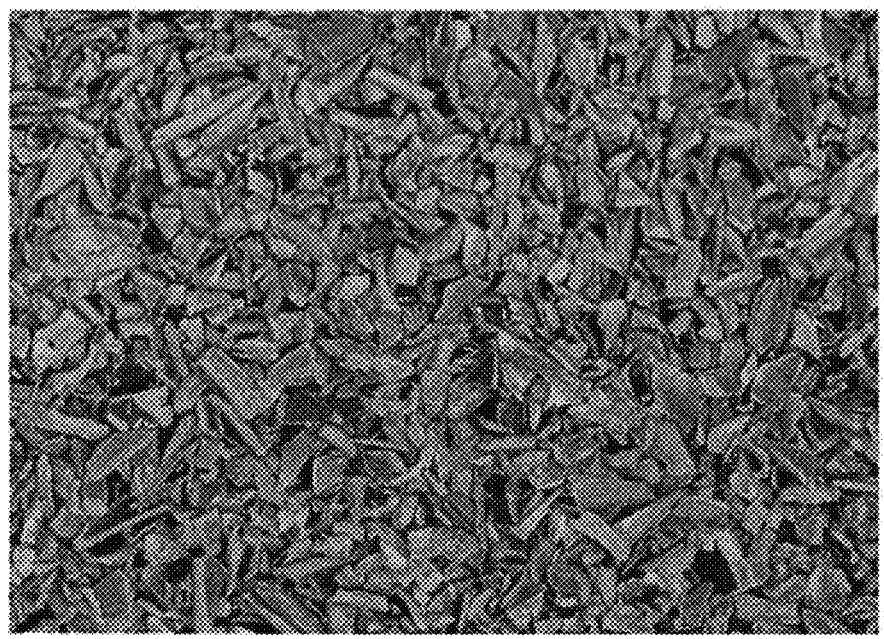
FIGS. 13A and 13B are photographs of an actual coated plastic raw material and an actual base after coating removal according to example 7 of the present invention.
Figure 13B:
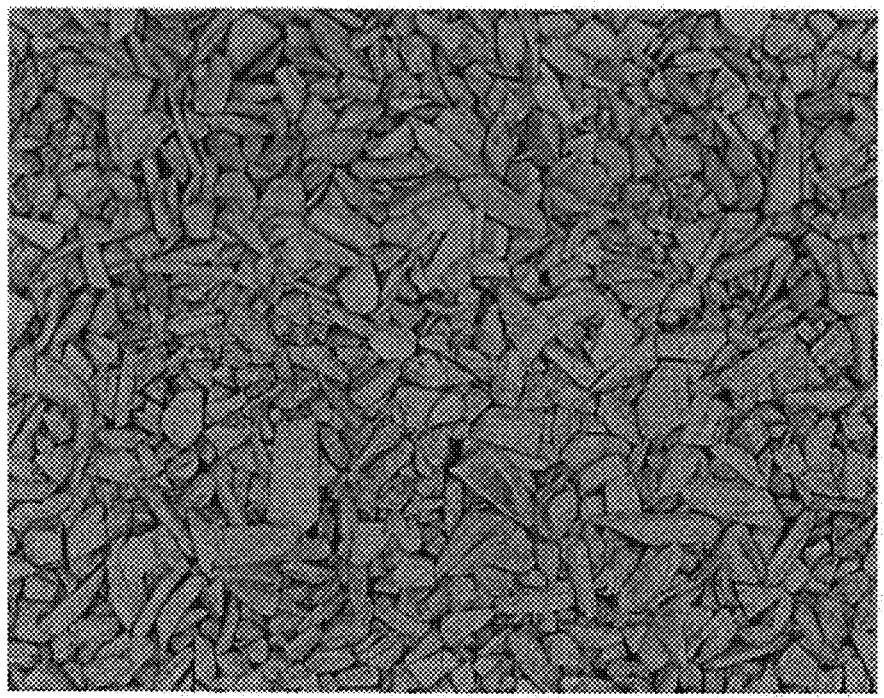

An example using the device for removing a coating on a coated plastic article according to an embodiment of the present invention will be described with reference to FIGS. 13A and 13B. FIGS. 13A and 13B are photographs of an actual coated plastic raw material and an actual base after coating removal according to example 7 of the present invention.

First, 250 g of coated pieces of a PC-ABS-resin coated product (company B) each with a size of 12 mm shown in FIG. 13A was placed into 600 ml of a 1-butanol remover, and stirred at a first temperature $T_1$ of 100° C. for 60 minutes at 400 rpm. As shown in FIG. 13B, the coating was completely removed from the base. However, the surface of the base was partially eluted and slightly bleached, and about 212 g of the base was recovered after stirring. This was seemingly caused by the elution of PC in 1-butanol, which was later confirmed in subsequent infrared analysis.

EXAMPLE 8

Figure 14A:
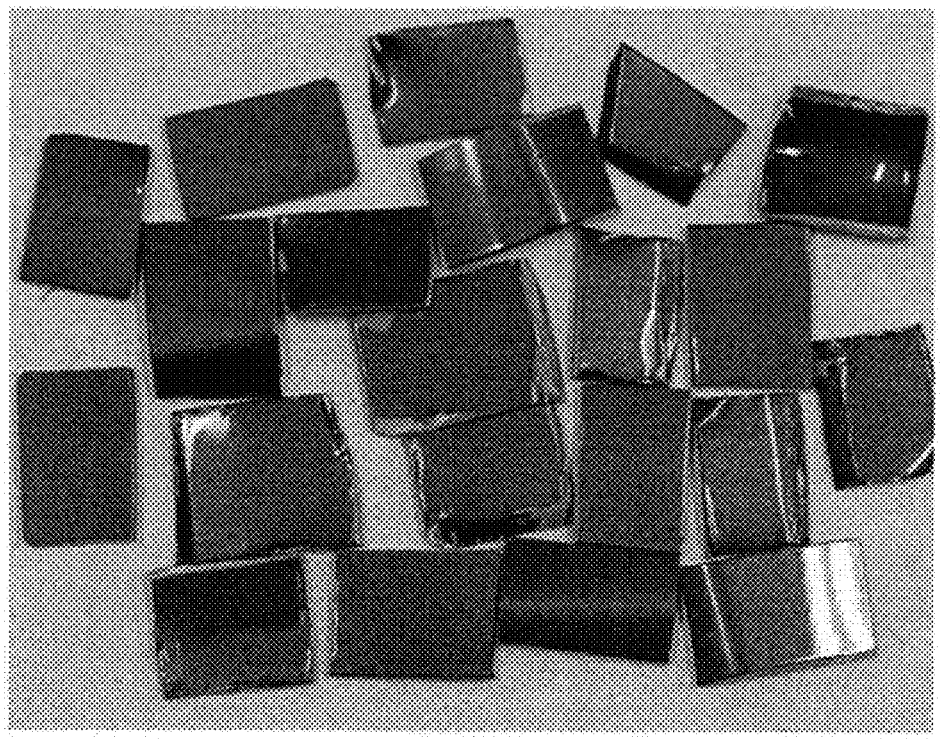
FIGS. 14A and 14B are photographs of an actual coated plastic raw material and an actual base after coating removal according to example 8 of the present invention.
Figure 14B:

An example using the device for removing a coating on a coated plastic article according to an embodiment of the present invention will be described with reference to FIGS. 14A and 14B. FIGS. 14A and 14B are photographs of an actual coated plastic raw material and an actual base after coating removal according to example 8 of the present invention.

First, 40 g of coated pieces of a PC-ABS-resin coated product (company B) each with a size of 15 to 20 mm shown in FIG. 14A was placed into 650 ml of a methanol remover, and stirred at a first temperature $T_1$ of 55° C. for 60 minutes at 380 rpm. As shown in FIG. 14B, the coating was completely removed from the base. No dissolution of resin was observed.

EXAMPLE 9

Figure 15A:
FIGS. 15A and 15B are photographs of an actual coated plastic raw material and an actual base after coating removal according to example 9 of the present invention.
Figure 15B:

An example using the device for removing a coating on a coated plastic article according to an embodiment of the present invention will be described with reference to FIGS. 15A and 15B. FIGS. 15A and 15B are photographs of an actual coated plastic raw material and an actual base after coating removal according to example 9 of the present invention.

First, 240 g of coated pieces of an ASA-resin coated product (company B) each with a size of 10 mm shown in FIG. 15A was placed into 650 ml of a methanol remover, and stirred at a first temperature $T_1$ of 50° C. for 60 minutes at 370 rpm. As shown in FIG. 15B, the coating was completely removed from the base.

EXAMPLE 10

An example using the device for removing a coating on a coated plastic article according to an embodiment of the present invention will be described with reference to FIGS. 16A to 16D. FIGS. 16A to 16D are photographs of an actual coated plastic raw material and an actual base after coating removal according to example 10 of the present invention.

Figure 16A:
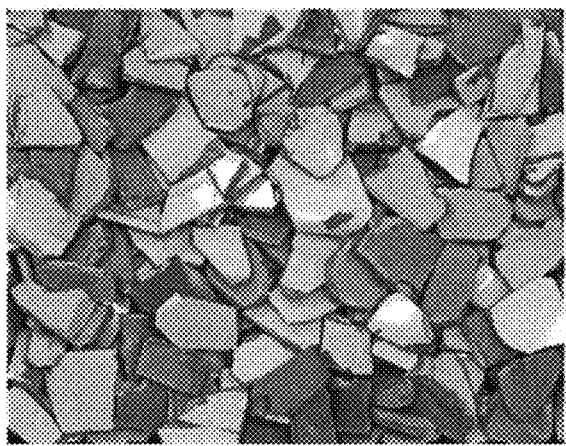
FIGS. 16A, 16B, 16C, and 16D are photographs of an actual coated plastic raw material and an actual base after coating removal according to example 10 of the present invention.
Figure 16B:
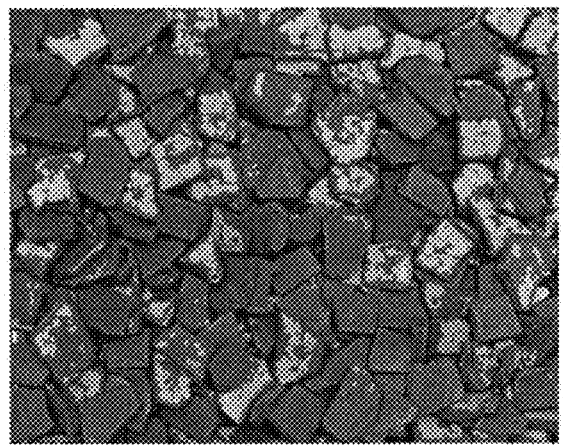

First, 150 g of coated pieces of a PC-ABS-resin coated product (company A) each with a size of 15 to 20 mm shown in FIG. 16A was placed into 650 ml of a methanol remover, and stirred at a first temperature $T_1$ of 55° C. for 60 minutes at 450 rpm. As shown in FIG. 16B, much coating was left on the base.

Figure 16C:
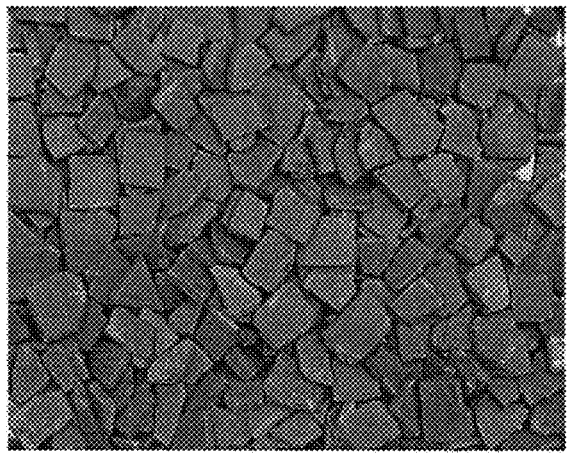

First, 150 g of coated pieces shown in FIG. 16A was placed into 650 ml of an ethanol remover, and stirred at a first temperature $T_1$ of 55° C. for 60 minutes at 450 rpm. As shown in FIG. 16C, the coating was completely removed from the base.

Figure 16D:
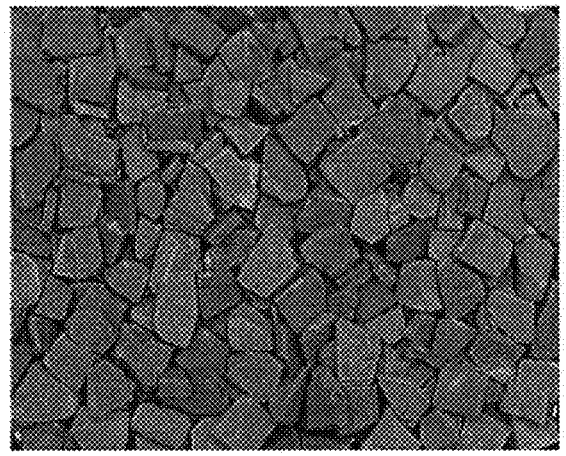

First, 150 g of coated pieces shown in FIG. 16A was placed into 650 ml of a 1-butanol remover, and stirred at a first temperature $T_1$ of 60° C. for 60 minutes at 370 rpm. As shown in FIG. 16D, the coating was completely removed from the base.

EXAMPLE 11

An example using the device for removing a coating on a coated plastic article according to an embodiment of the present invention will be described with reference to FIGS. 17A to 17E. FIGS. 17A to 17E are photographs of an actual coated plastic raw material and an actual base after coating removal according to example 11 of the present invention.

Figure 17A:
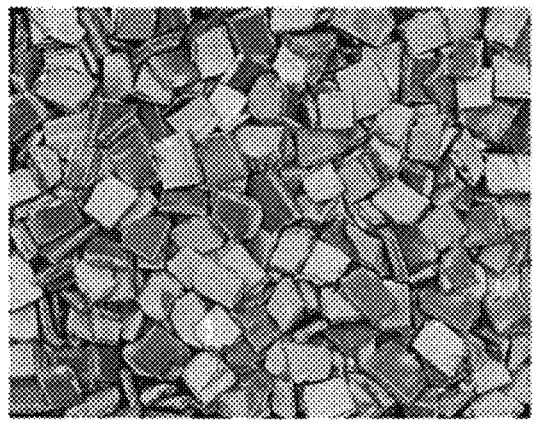
FIGS. 17A, 17B, 17C, 17D, and 17E are photographs of an actual coated plastic raw material and an actual base after coating removal according to example 11 of the present invention.
Figure 17B:
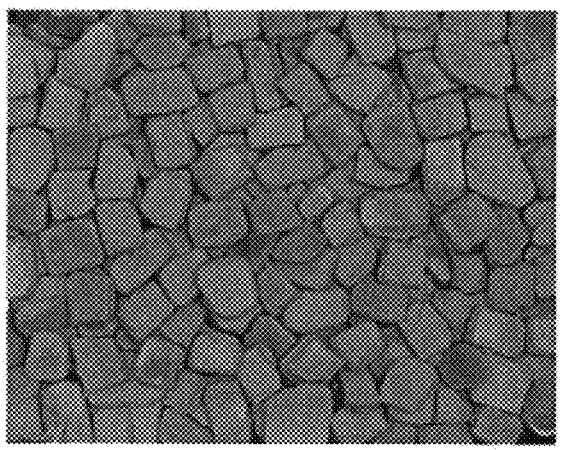

First, 150 g of coated pieces of an ABS-resin coated product (company A) each with a size of 15 to 20 mm shown in FIG. 17A was placed into 700 ml of a methanol remover, and stirred at a first temperature $T_1$ of 50° C. for 60 minutes at 250 rpm initially, and then at 450 rpm. As shown in FIG. 17B, the coating was completely removed from the base, but the base surface was bleached.

Figure 17C:
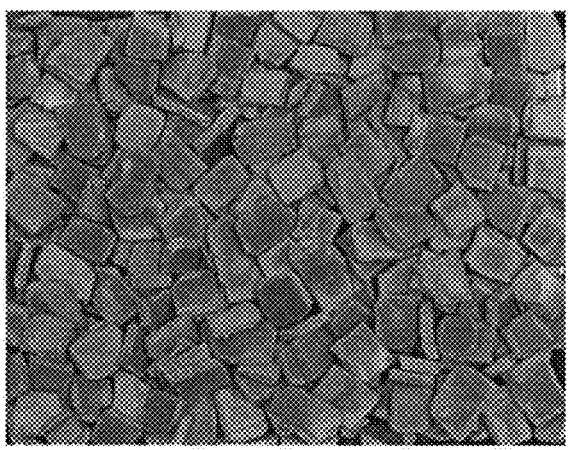

First, 150 g of coated pieces shown in FIG. 17A was placed into 700 ml of an ethanol remover, and stirred at a first temperature $T_1$ of 55° C. for 60 minutes at 250 rpm initially, and then at 450 rpm. As shown in FIG. 17C, the coating was completely removed from the base.

Figure 17D:
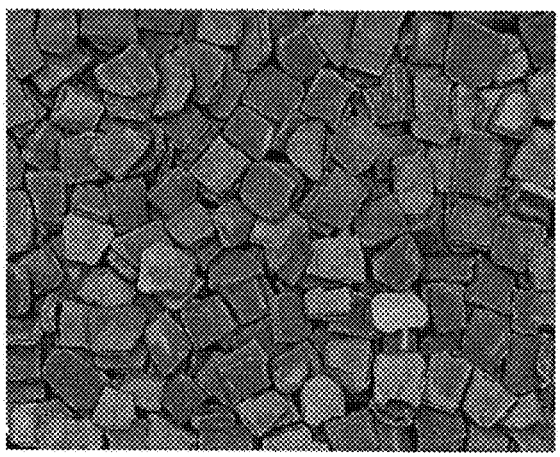

First, 150 g of coated pieces shown in FIG. 17A was placed into 700 ml of a 1-butanol remover, and stirred at a first temperature $T_1$ of 60° C. for 60 minutes at 250 rpm initially, and then at 450 rpm. As shown in FIG. 17D, the coating was completely removed from the base.

Figure 17E:
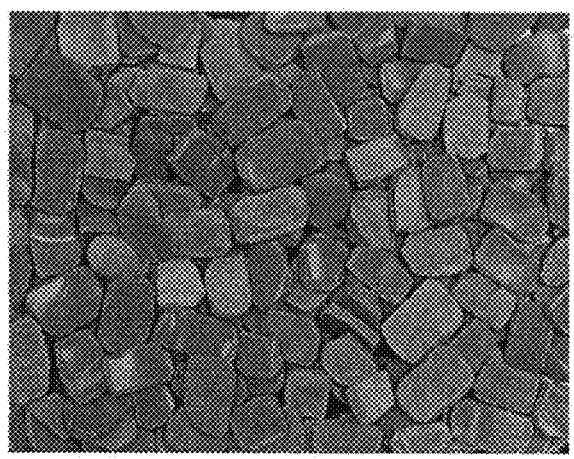

First, 150 g of coated pieces shown in FIG. 17A was placed into 700 ml of a 1-butanol remover, and stirred at a first temperature $T_1$ of 60° C. for 30 minutes at 450 rpm. As shown in FIG. 17E, the coating was completely removed from the base.

EXAMPLE 12

Figure 18A:
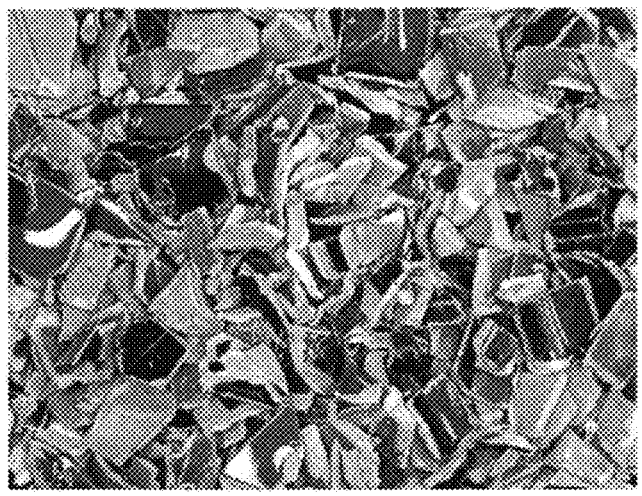
FIGS. 18A, 18B, and 18C are photographs of an actual coated plastic raw material and an actual base after coating removal according to example 12 of the present invention.
Figure 18B:
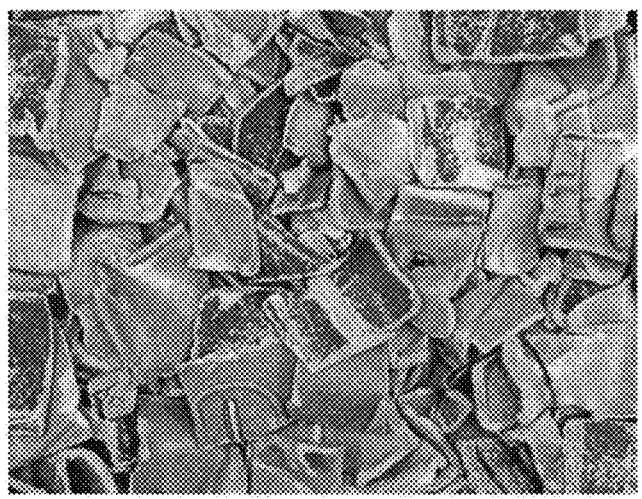
Figure 18C:
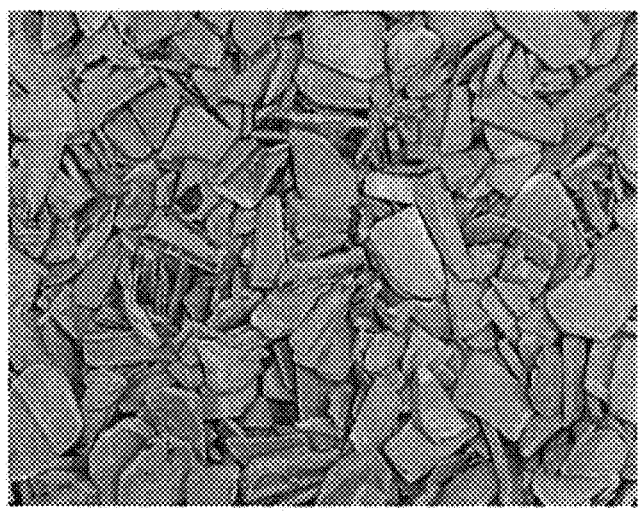

An example using the device for removing a coating on a coated plastic article according to an embodiment of the present invention will be described with reference to FIGS. 18A to 18C. FIGS. 18A to 18C are photographs of an actual coated plastic raw material and an actual base after coating removal according to example 12 of the present invention. The present example uses the filter container 17 with the fins 16 described above.

First, 300 g of coated pieces of a red PC-ABS-resin coated product (company B) each with a size of 30 mm shown in FIG. 18A was placed into 1000 ml of a methanol remover, and stirred at a first temperature $T_1$ of 50° C. for 20 minutes at 800 rpm. As shown in FIG. 18B, the coating was removed with a little left on the base.

First, 300 g of coated pieces shown in FIG. 18A was placed into 1500 ml of an ethanol remover, immersed in the remover at a second temperature $T_2$ of 50° C. for ten minutes, and stirred at a first temperature $T_1$ of 50° C. for 30 minutes at 800 rpm. As shown in FIG. 18C, the coating was almost completely removed.

EXAMPLE 13

Figure 19A:
FIGS. 19A and 19B are photographs of an actual coated plastic raw material and an actual base after coating removal according to example 13 of the present invention.
Figure 19B:
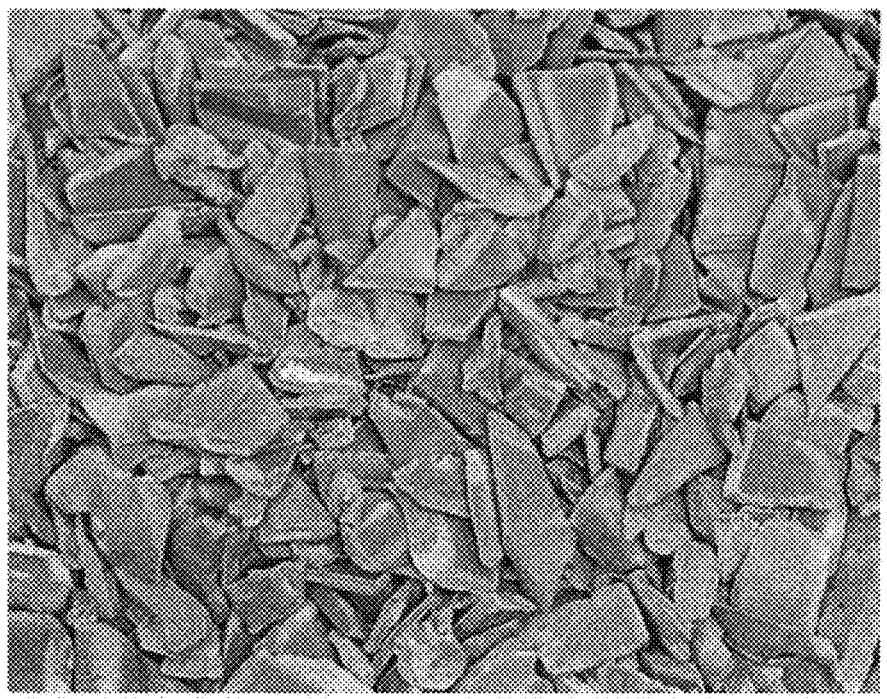

An example using the device for removing a coating on a coated plastic article according to an embodiment of the present invention will be described with reference to FIGS. 19A and 19B. FIGS. 19A and 19B are photographs of an actual coated plastic raw material and an actual base after coating removal according to example 13 of the present invention. The present example uses the filter container 17 with the fins 16 described above.

First, 300 g of coated pieces of a white PC-ABS-resin coated product (company B) each with a size of 30 mm shown in FIG. 19A was placed into 1400 ml of a methanol remover, immersed in the remover at a second temperature $T_2$ of 40° C. for five minutes, and stirred at a first temperature $T_1$ of 40° C. for 25 minutes at 800 rpm. As shown in FIG. 19B, the coating was completely removed from the base.

EXAMPLE 14

An example using the device for removing a coating on a coated plastic article according to an embodiment of the present invention will be described with reference to FIGS. 20A to 20E. FIGS. 20A to 20E are photographs of an actual coated plastic raw material and an actual base after coating removal according to example 14 of the present invention. The present example uses the filter container 17 with the fins 16 described above.

Figure 20A:
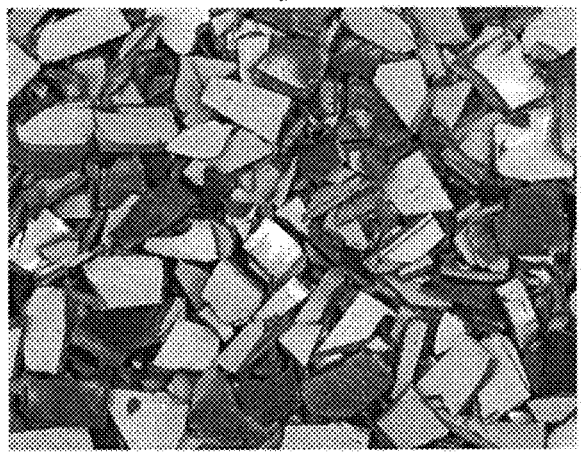
FIGS. 20A, 20B, 20C, 20D, and 20E are photographs of an actual coated plastic raw material and an actual base after coating removal according to example 14 of the present invention.
Figure 20B:
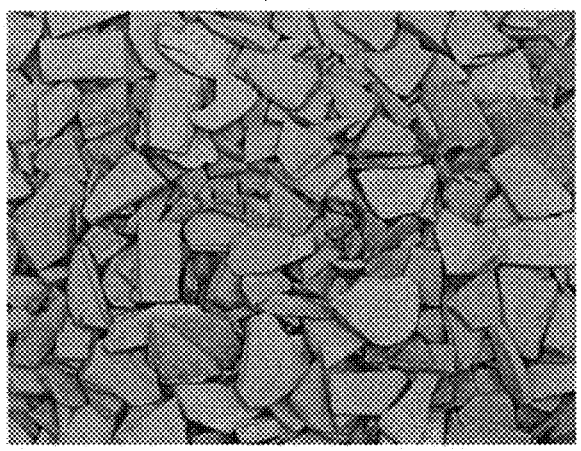
Figure 20C:

First, 300 g of coated pieces of a white ABS-resin coated product (company B) each with a size of 30 mm shown in FIG. 20A was placed into 1400 ml of a methanol remover, immersed in the remover at a second temperature $T_2$ of 50° C. for five minutes, and stirred at a first temperature $T_1$ of 50° C. for 25 minutes at 800 rpm. As shown in FIG. 20B, the coating was completely removed from the base. As shown in FIG. 20C, the coating was swollen and separate from the base.

Figure 20D:

First, 300 g of coated pieces shown in FIG. 20A was placed into 1500 ml of an ethanol remover, immersed in the remover at a second temperature $T_2$ of 50° C. for ten minutes, and stirred at a first temperature $T_1$ of 50° C. for 20 minutes at 800 rpm. As shown in FIG. 20D, the coating was completely removed from the base, but the ABS resin of the base was dissolved. Thus, the removed coating adhered again to the surface from which the ABS resin was dissolved.

Figure 20E:
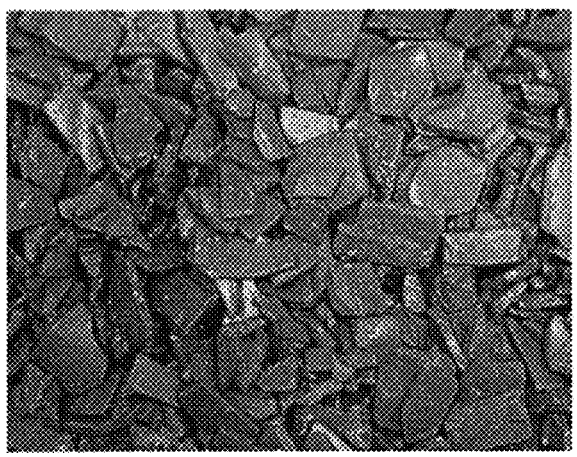

First, 300 g of coated pieces shown in FIG. 20A was placed into 1400 ml of an ethanol remover, immersed in the remover at a second temperature $T_2$ of 40° C. for ten minutes, and stirred at a first temperature $T_1$ of 40° C. for 20 minutes at 800 rpm. As shown in FIG. 20E, the coating was completely removed from the base, but the ABS resin of the base was partially dissolved with a smaller degree than in FIG. 20D. Thus, the removed coating adhered again to the surface from which the ABS resin was dissolved.

EXAMPLE 15

An example using the device for removing a coating on a coated plastic article according to an embodiment of the present invention will be described with reference to FIGS. 21A to 21D. FIGS. 21A to 21D are photographs of an actual coated plastic raw material and an actual base after coating removal according to example 15 of the present invention. The present example uses the filter container 17 with the fins 16 described above.

Figure 21A:
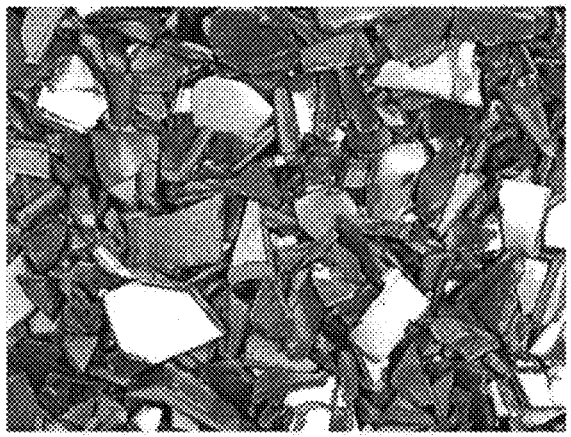
FIGS. 21A, 21B, 21C, and 21D are photographs of an actual coated plastic raw material and an actual base after coating removal according to example 15 of the pre-sent invention.
Figure 21B:
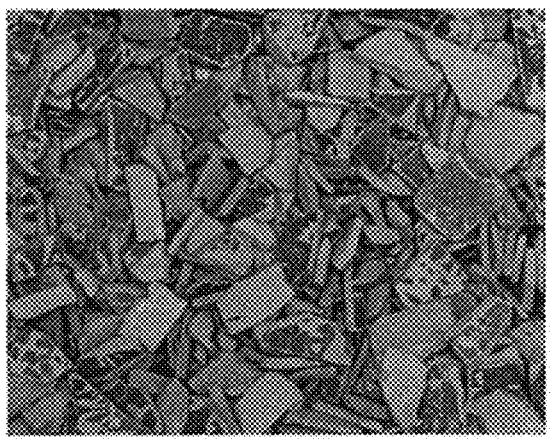

First, 300 g of coated pieces of a silver ABS-resin coated product (company B) each with a size of 30 mm shown in FIG. 21A was placed into 1400 ml of a methanol remover, immersed in the remover at a second temperature $T_2$ of 50° C. for five minutes, and stirred at a first temperature $T_1$ of 50° C. for 25 minutes at 800 rpm. As shown in FIG. 21B, the sliver metallic portion of the coating was removed, but the dark gray underlayer was left.

Figure 21C:
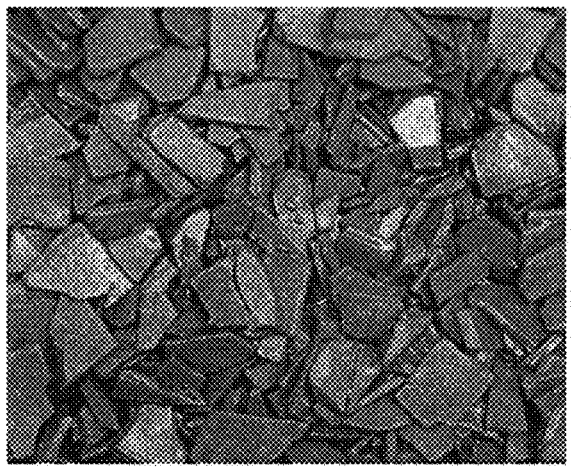

First, 300 g of coated pieces shown in FIG. 21A was placed into 1400 ml of an ethanol remover, immersed in the remover at a second temperature $T_2$ of 40° C. for ten minutes, and stirred at a first temperature $T_1$ of 40° C. for 20 minutes at 800 rpm. As shown in FIG. 21C, the coating was completely removed from the base, but the ABS resin of the base was partially dissolved. Thus, the removed coating adhered again to the surface from which the ABS resin was dissolved.

Figure 21D:

First, 300 g of coated pieces shown in FIG. 21A was placed into 1400 ml of a remover containing ethanol and methanol in a one-to-one volume ratio, immersed in the remover at a second temperature $T_2$ of 40° C. for ten minutes, and stirred at a first temperature $T_1$ of 40° C. for 20 minutes at 800 rpm. As shown in FIG. 21D, the coating was completely removed from the base.

In examples 1 and 2, the ethanol or 1-butanol remover 53 heated to the second temperature $T_2$ swelled the base 51 and the coating 52 except the coated pieces of the PP bumper as shown in FIG. 6.

In example 3, the pieces were stirred after heated to a temperature not lower than the boiling point of methanol with a known pressure vessel, and rated good, or in other words, a little coating was left on the base, seemingly resulting from the advantageous effects of the known technique.

As shown in FIG. 6, examples 5 to 15 were rated good or excellent, or in other words, the coating was completely removed from the base, except the top rows of examples 5 and 10. Although the base 51 was partially dissolved in example 7, the middle and bottom rows of example 14, and the upper and middle rows of example 15, the base 51 was not dissolved in other examples. The results demonstrate that the coating removal methods 30 and 30a to 30c can cause either or both the base 51 and the coating 52 to swell without dissolved in the remover 53 for more efficiently separating the base 51 and the coating 52 from each other than with known techniques.

The coating removal methods 30 and 30a to 30c can substantially prevent dissolution of the base 51 and the coating 52. Thus, the base 51 from which the coating 52 is removed and the remover 53 can be easily recovered and recycled at a high recovery rate. In the immersion process in step S2 or the heating process in step S3, monohydric lower alcohol is heated without exceeding a temperature that is 10° C. lower than the boiling point to swell either or both the base 51 and the coating 52. Such a process eliminates an expensive apparatus such as a pressure vessel, and allows safe operations in the processes from the immersion process in step S2 to the stirring process in step S4.

In particular, as the result of example 4 shows, the coating removal method 30a uses inexpensive 1-butanol as the remover 53, and can thus keep the first temperature $T_1$ at about 100° C. For example, as the result of example 4 shows, the coating removal method 30a can swell, without a pressure vessel, either or both the base 51 and the coating 52 more appropriately than example 3 according to a known technique. The method can thus lower the installation and operation costs.

For example, as the results of examples 9, 11 (top and second rows), and 13 show, the coating removal method 30b prevents the base 51 containing ABS or ASA resin from dissolving or prevents the pieces 50a from adhering to the dissolved portion. The coating removal method 30b can thus fully separate the base 51 and the coating 52 from each other unlike with known techniques, and highly efficiently recover the base 51 and the coating 52.

As the results of examples 5 and 6 show, the coating removal method 30c reveals that the remover containing a sodium hydroxide solution facilitates removal of the coating 52 from the base 51 compared with the remover containing no sodium hydroxide solution. Known techniques cannot fully remove the coating containing the primer coating from the base containing PP as a main component. However, as shown in the bottom row of examples 5 and 6, the coating removal method 30c has substantially responded to the above issue with the results of the coating removed with a little left on the base or completely removed from the base.

The coating removal devices 1 and 1a to 1d according to aspects of the invention are not limited to those described in the present examples. For example, instead of being transported from the reactor 3A to the reactor 3B with the pump 7 or other devices, the remover 53 may be transported through a liquid transport pipe connecting the reactors 3A and 3B with the opening 5c in the reactor 3A located vertically lower than the opening 5c in the reactor 3B. The total number of fins 16 is not limited to eight. When two or more fins 16 are provided, the fins 16 may not be arranged equally along the circumference of the container 5. The fins 16 may form an angle θ other than 15 degrees with respect to the first direction α or the horizontal direction H.

The coating removal methods 30 and 30a to 30c according to embodiments of the present invention are not limited to those described in the present examples. For example, the second temperature $T_2$ in the immersion process in step S2 and the first temperature $T_1$ in the heating process in step S3 may be different when the second temperature $T_2$ is not higher than the upper limit temperature of the first temperature $T_1$.

INDUSTRIAL APPLICABILITY

The present invention is applicable to a method and a device for removing, with a remover, a coating containing a synthetic resin component on a plastic base surface of a coated plastic article.

REFERENCE SIGNS LIST 1 coating removal device
1a coating removal device
1b coating removal device
1c coating removal device
1d coating removal device
2 heater
3A reactor
3B reactor
4A stirrer
4B stirrer
5 container
5a side wall
5b bottom
5c opening
5d inner peripheral surface
6 lid
7 pump
7a liquid transport pipe
7b liquid transport pipe
8 filtering device
8a liquid transport pipe
8b liquid transport pipe
9 capacitor
9a vent
9b return pipe
10 stirring member
10a stirring member
10b stirring member
10c stirring member
11 motor
12 rotational shaft
12a upper end
12b lower end
13 stir blade
14 bearing
15A reactor
15B reactor
16 fin
16a slope
17 filter container
18 frame
18a bar
18b ring
18c inner surface
19 filter
20A stirrer
21A stirrer 30 coating removal method
30a coating removal method
30b coating removal method
30c coating removal method
50 coated plastic article
50a piece
51 base
52 coating
53 remover

The invention claimed is:

1. A method for removing a coating on a coated plastic article with a remover, the coating containing a synthetic resin component and being on a surface of a plastic base included in the coated plastic article, the method comprising:
shredding the coated plastic article into a plurality of pieces;
heating the remover to a first temperature; and
stirring the plurality of pieces with the heated remover,
wherein the remover includes at least one monohydric lower alcohol selected from the group consisting of methanol, ethanol, propanol, and 1-butanol, and swells at least one of the base or the coating,
the base is free from polycarbonate and contains polyolefin as a main component,
the remover is 1-butanol,
the first temperature is not lower than 70° C. and not higher than a temperature that is 10° C. lower than the boiling point of the remover,
the method further comprises, before the stirring, immersing the plurality of pieces in the remover heated to a second temperature, and
the second temperature is not higher than an upper limit temperature of the first temperature.

2. The method according to claim 1, wherein
the base is free from polycarbonate, polyester, and polyurethane, and
the remover contains a sodium hydroxide solution and a sodium hydroxide concentration in the remover is in a range of 0.01 to 0.5 wt %.

3. The method according to claim 1, wherein
the plurality of pieces have a maximum size in a range of 10 to 100 mm.

4. A method for removing a coating on a coated plastic article with a remover, the coating containing a synthetic resin component and being on a surface of a plastic base included in the coated plastic article, the method comprising:
shredding the coated plastic article into a plurality of pieces;
heating the remover to a first temperature; and
stirring the plurality of pieces with the heated remover,
wherein the remover includes at least one monohydric lower alcohol selected from the group consisting of methanol, ethanol, propanol, and 1-butanol, and swells at least one of the base or the coating,
the base contains acrylonitrile butadiene styrene resin or acrylonitrile styrene acrylate resin,
the remover includes one selected from the group consisting of methanol, ethanol, and a mixture of methanol and ethanol,
the first temperature is not lower than 25° C. and not higher than 55° C.,
the method further comprises, before the stirring, immersing the plurality of pieces in the remover heated to a second temperature, and
the second temperature is not higher than an upper limit temperature of the first temperature.

5. The method according to claim 4, wherein
the base is free from polycarbonate, polyester, and polyurethane, and
the remover contains a sodium hydroxide solution and a sodium hydroxide concentration in the remover is in a range of 0.01 to 0.5 wt %.

6. The method according to claim 4, wherein
the plurality of pieces have a maximum size in a range of 10 to 100 mm.

* * * * *